(12) United States Patent
Nakamura et al.

(10) Patent No.: US 8,120,606 B2
(45) Date of Patent: Feb. 21, 2012

(54) THREE-DIMENSIONAL IMAGE OUTPUT DEVICE AND THREE-DIMENSIONAL IMAGE OUTPUT METHOD

(75) Inventors: Satoshi Nakamura, Saitama (JP); Mikio Watanabe, Saitama (JP); Koichi Yahagi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/147,932

(22) PCT Filed: Jan. 26, 2010

(86) PCT No.: PCT/JP2010/051311
§ 371 (c)(1),
(2), (4) Date: Aug. 4, 2011

(87) PCT Pub. No.: WO2010/090150
PCT Pub. Date: Aug. 12, 2010

(65) Prior Publication Data
US 2011/0292045 A1    Dec. 1, 2011

(30) Foreign Application Priority Data

Feb. 5, 2009 (JP) ................................. 2009-025261
Dec. 2, 2009 (JP) ................................. 2009-274451

(51) Int. Cl.
*G06T 15/00* (2011.01)
*H04N 13/00* (2006.01)
*H04N 15/00* (2006.01)
*G06K 9/00* (2006.01)
*G06K 9/40* (2006.01)

(52) U.S. Cl. ............ 345/419; 348/42; 348/51; 382/154; 382/254

(58) Field of Classification Search .................. None
See application file for complete search history.

(56) References Cited

U.S. PATENT DOCUMENTS 6,381,360 B1 *  4/2002  Sogawa ................... 382/154
2001/0045979 A1  11/2001  Matsumoto et al.
(Continued)

FOREIGN PATENT DOCUMENTS

AU    2003221346 A1    9/2004
(Continued)

OTHER PUBLICATIONS

International Preliminary Report on Patentability in related application PCT/JP2010/051311 issued Aug. 9, 2011.

*Primary Examiner* — Xiao M. Wu
*Assistant Examiner* — Tize Ma
(74) *Attorney, Agent, or Firm* — Sughrue Mion, PLLC

(57) ABSTRACT

A three-dimensional image output device includes: a viewpoint image acquiring device for acquiring a plurality of viewpoint images obtained by photographing a same subject from a plurality of viewpoints; a parallax information acquiring device for acquiring parallax amounts in a plurality of sets of feature points at which features substantially correspond to one another from the acquired plurality of viewpoint images; a parallax amount adjusting device for adjusting the parallax amount in each of the acquired feature points, and performing adjustment of assigning different weights to the parallax amounts in accordance with values of the parallax amounts; a parallax image generating device for generating a parallax image corresponding to the parallax amount of each of the feature points after the adjustment; and a parallax image output device for outputting a plurality of parallax images including the generated parallax image.

22 Claims, 16 Drawing Sheets

U.S. PATENT DOCUMENTS

| | | |
|---|---|---|
| 2004/0233275 A1 | 11/2004 | Tomita |
| 2005/0089212 A1* | 4/2005 | Mashitani et al. ............ 382/154 |
| 2006/0290778 A1 | 12/2006 | Kitaura et al. |

FOREIGN PATENT DOCUMENTS

| | | |
|---|---|---|
| CN | 1864415 A | 11/2006 |
| EP | 1 662 809 A1 | 5/2006 |
| JP | 8-331607 A | 12/1996 |
| JP | 10-040420 A | 2/1998 |
| JP | 2003-209858 A | 7/2003 |
| JP | 2004-221700 A | 8/2004 |
| JP | 2004-351058 A | 12/2004 |
| JP | 2005-073049 A | 3/2005 |
| JP | 2006-115198 A | 4/2006 |
| KR | 10-2006-0087511 A | 8/2006 |
| WO | 2004/082297 A1 | 9/2004 |
| WO | 2004/084560 A1 | 9/2004 |
| WO | 2005/020591 A1 | 3/2005 |

* cited by examiner

FEATURE POINT l
FEATURE POINT m

PHOTOGRAPHING DIRECTION

| INDIVIDUAL IMAGE VIEWPOINT NUMBER | FEATURE POINT l | FEATURE POINT m |
|---|---|---|
| 1 | (622, 320) | (816, 540) |
| 2 | (618, 320) | (822, 540) |
| 3 | (614, 320) | (828, 540) |
| 4 | (610, 320) | (834, 540) |

FIG.10
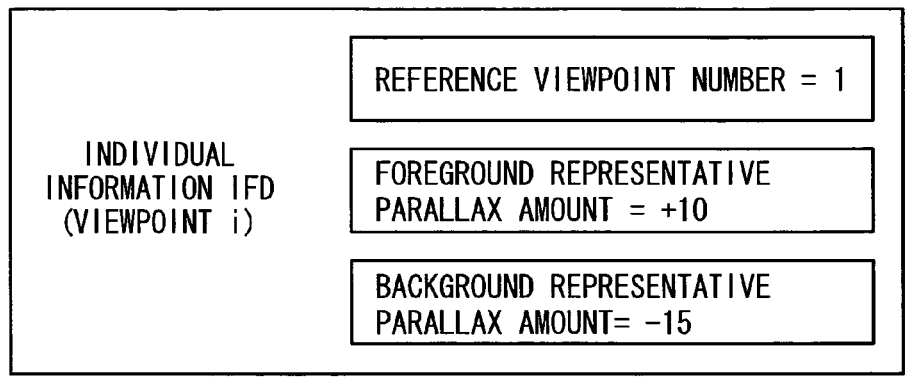
FIG.11
| INDIVIDUAL IMAGE VIEWPOINT NUMBER | REFERENCE VIEWPOINT NUMBER TAG VALUE | FOREGROUND REPRESENTATIVE PARALLAX AMOUNT TAG VALUE | BACKGROUND REPRESENTATIVE PARALLAX AMOUNT TAG VALUE |
|---|---|---|---|
| 1 | 1 | 0 | 0 |
| 2 | 1 | +10 | −5 |
| 3 | 1 | +20 | −10 |
| 4 | 1 | +30 | −20 |
FIG.12
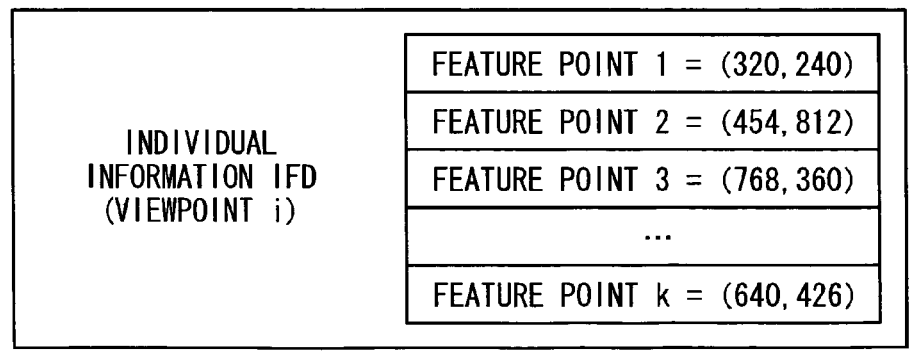

| FEATURE POINT | 1 | 2 | 3 | ... | i | ... | n |
|---|---|---|---|---|---|---|---|
| PARALLAX AMOUNT | +5 | -1.5 | 0 | ... | +10 | ... | -10 |
| Δx | +1 | +3 | 0 | ... | +2 | ... | +2 |

# THREE-DIMENSIONAL IMAGE OUTPUT DEVICE AND THREE-DIMENSIONAL IMAGE OUTPUT METHOD

This application is a National Stage of International Application No. PCT/JP2010/051311 filed Jan. 26, 2010, claiming priority based on Japanese Patent Application Nos. 2009-025261, filed Feb. 5, 2009 and 2009-274451 filed on Dec. 2, 2009, the contents of all of which are incorporated herein by reference in their entirety.

TECHNICAL FIELD

The presently disclosed subject matter relates to a three-dimensional image output device and method, and particularly relates to a technique of displaying a favorable three-dimensional image (stereoscopic image) by a three-dimensional image display device.

BACKGROUND ART

Conventionally, there have been proposed a stereoscopic image generating method in which a viewpoint position of a viewpoint image which configures a stereoscopic image is automatically adjusted in correspondence with the stereoscopic display device in use, and a crosstalk at the time of observation is reduced so that a natural stereoscopic image can be displayed (PTL1).

In the stereoscopic image generating method described in PTL1, a plurality of viewpoints corresponding to a stereoscopic display device are determined from device information relating to the stereoscopic display device, and from parallax information relating to parallax of a plurality of determined viewpoints and a plurality of first viewpoint images, the aforementioned first viewpoint images are converted into a plurality of second parallax images corresponding to the aforementioned plurality of viewpoints.

Further, in order to solve the problem of being unable to provide stereoscopic vision since the parallax amount is increased if the size of the stereoscopic display device is large, or if the resolution is low, when three-dimensional video is displayed on various stereoscopic display devices, there is proposed a stereoscopic video reproducing apparatus which changes the parallax amount by displaying the stereoscopic video by reducing it when the parallax amount of the stereoscopic video in a certain stereoscopic display device is larger than the parallax amount in the stereoscopic display device optimal for the stereoscopic video (PTL2).

CITATION LIST

Patent Document

PTL1: Japanese Patent Application Laid-Open No. 2006-115198
PTL2: Japanese Patent Application Laid-Open No. 2005-73049

SUMMARY OF THE INVENTION

Technical Problem

However, in the stereoscopic image generating method described in PTL1, the virtual viewpoints are determined based on the information of the size and the like of a stereoscopic display device in use, and the parallax image is generated as if it were photographed from the virtual viewpoints, whereby a crosstalk at the time of observation can be reduced, and the image can be displayed as a stereoscopic image, but the parallax images are indiscriminately generated irrespective of the perspective of a subject. Therefore, a stereoscopic image with less stereoscopic vision, and a stereoscopic image with stereoscopic vision being excessively emphasized are likely to be generated depending on a plurality of the original viewpoint images, and a stereoscopic image providing preferable stereoscopic vision cannot be necessarily generated.

Further, the stereoscopic video reproducing apparatus described in PTL2 cannot reproduce a stereoscopic video with more preferable stereoscopic vision, as in the invention described in PTL1, and it further has the problem of being unable to use the entire display screen of a stereoscopic display device effectively since a stereoscopic video is displayed by being reduced when the parallax amount of the stereoscopic video in a certain stereoscopic display device becomes larger than the parallax amount in the stereoscopic display device optimal for the stereoscopic video.

More specifically, the inventions described in PTLs 1 and 2 generate the stereoscopic images so that the stereoscopic images can be visually recognized as stereoscopic images irrespective of a stereoscopic display device in use, but do not put any thought into generating stereoscopic images capable of providing more preferable stereoscopic vision.

The presently disclosed subject matter is made in view of such circumstances, and has an object to provide a three-dimensional image output device and method which can perform weighting adjustment (give a variation in intensity) in accordance with the parallax amounts which occur in the foreground and background, and can output a parallax image with more preferable stereoscopic vision.

Solution to Problem

In order to attain the aforementioned object, the first aspect of the presently disclosed subject matter provides a three-dimensional image output device including: a viewpoint image acquiring device for acquiring a plurality of viewpoint images obtained by photographing a same subject from a plurality of viewpoints; a parallax information acquiring device for acquiring parallax amounts in a plurality of sets of feature points at which features substantially correspond to one another from the acquired plurality of viewpoint images; a parallax amount adjusting device for adjusting the parallax amount in each of the acquired feature points, and performing adjustment of assigning different weights to the parallax amounts in accordance with values of the parallax amounts; a parallax image generating device for generating a parallax image corresponding to the parallax amount of each of the feature points after the adjustment; and a parallax image output device for outputting a plurality of parallax images including the generated parallax image.

According to the first aspect, the parallax amount can be adjusted mare freely than the case of adjusting the parallax amounts indiscriminately irrespective of the perspective of the subject, and adjustment of the parallax amounts can be freely performed (intensity of the parallax can be freely given) for the foreground and the background, whereby a parallax image with more preferable stereoscopic vision can be generated and outputted.

The second aspect of the presently disclosed subject matter provides the three-dimensional image output device according to the first aspect, wherein the parallax information acquiring device acquires coordinate values of a plurality of sets of feature points at which features correspond to one another from the plurality of acquired viewpoint images, and acquires a difference of the coordinate values as the parallax amount in each of the feature points.

The parallax information acquiring device can acquire the coordinate values of a plurality of sets of feature points by reading them from the attribute information of the three-dimensional image file storing a plurality of viewpoint images, or can be acquired by extracting the corresponding feature points from a plurality of parallax images.

The third aspect of the presently disclosed subject matter provides the three-dimensional image output device according to the first or the second aspect, wherein the parallax information acquiring device acquires a plurality of parallax amounts including a foreground representative parallax amount representing a parallax amount of a feature point which is nearest to a prescribed viewpoint at which one of the viewpoint images are taken, and a background representative parallax amount representing a parallax amount of a feature point which is farthest from the prescribed viewpoint.

The parallax information acquiring device can acquire the foreground representative parallax amount and background representative parallax amount by reading them from the attribute information of the three-dimensional image file which stores a plurality of viewpoint images, and can acquire them by detecting the maximum value and the minimum value of the difference values of the coordinate values of a plurality of sets of feature points. In the third aspect, the prescribed viewpoint can be a centrally-positioned viewpoint or a substantially centrally-positioned viewpoint among the plurality of viewpoints when the plurality of viewpoints are arranged along a direction. Also, the prescribed viewpoint can be a viewpoint where a photographing unit for photographing a reference image is located, the reference image used as a reference of the parallax amount calculation.

The fourth aspect of the presently disclosed subject matter provides the three-dimensional image output device according to any one of the first to the third aspect, wherein the parallax amount adjusting device classifies a plurality of parallax amounts acquired by the parallax information acquiring device into at least three kinds of parallax amounts, the parallax amounts including a parallax amount of a near feature point, a parallax amount of a far feature point, and a parallax amount of a feature point other than the near feature point and the far feature point, and performs adjustment of a parallax amount of assigning a different weight to each of the classified parallax amounts.

Adjustment of the parallax amount with different weights in accordance with the parallax amounts can be performed continuously without being limited to the case of performing adjustment of the parallax amount according to classification of the parallax amounts which are classified into three or more as described above (stepwise).

The fifth aspect of the presently disclosed subject matter provides the three-dimensional image output device according to any one of the first to the fourth aspect, wherein the parallax amount adjusting device performs weighting adjustment for a parallax amount of the near feature point to make the parallax amount larger, and performs weighting adjustment for a parallax amount of the far feature point to make the parallax amount smaller.

Thereby, the viewpoint image with the foreground seeming to pop up more forward while a sense of depth of the background is suppressed can be generated, and a stereoscopic image with more impactful stereoscopic vision can be displayed.

The sixth aspect of the presently disclosed subject matter provides the three-dimensional image output device according to any one of the first to the fourth aspect, wherein the parallax amount adjusting device performs weighting adjustment for the parallax amount of the near feature point to make the parallax amount smaller, and performs weighting adjustment for the parallax amount of the far feature point to make the parallax amount larger.

Thereby, the parallax image with the sense of depth of the background being emphasized while the popping-up amount of the foreground is suppressed can be generated, and a stereoscopic image with soft stereoscopic vision can be displayed.

The seventh aspect of the presently disclosed subject matter provides the three-dimensional image output device according to any one of the third to the sixth aspects, wherein the parallax amount adjusting device adjusts the foreground representative parallax amount and the background representative parallax amount after adjustment to be predetermined parallax amounts respectively.

Thereby, a crosstalk due to emphasis of stereoscopic vision and the like can be prevented from occurring.

The eighth aspect of the presently disclosed subject matter provides the three-dimensional image output device according to any one of the first to the seventh aspects, wherein the parallax amount adjusting device includes a conversion table representing an input-output relationship of a parallax amount and a parallax adjustment parameter for adjusting the parallax amount, the parallax amount adjusting device reads out a parallax adjustment parameter corresponding to the parallax amount of each of the acquired feature points from the conversion table and performs adjustment of assigning different weights to the parallax amounts in accordance with values of the parallax amounts.

The ninth aspect of the presently disclosed subject matter provides the three-dimensional image output device according to any one of the first to the seventh aspects, wherein the parallax amount adjusting device includes a conversion table representing an input-output relationship of a parallax amount and an adjusted parallax amount obtained by adjusting the parallax amount, the parallax amount adjusting device reads out an adjusted parallax amount corresponding to the parallax amount of each of the acquired feature points from the conversion table.

The tenth aspect of the presently disclosed subject matter provides the three-dimensional image output device according to the eighth aspect, wherein the parallax adjustment parameter in the conversion table is adjusted so that the adjusted parallax amount adjusted based on the parallax adjustment parameter cannot be greater than a prescribed maximum parallax amount.

The eleventh aspect of the presently disclosed subject matter provides the three-dimensional image output device according to the ninth aspect, wherein the adjusted parallax amount in the conversion table cannot be greater than a prescribed maximum parallax amount.

The twelfth aspect of the presently disclosed subject matter provides the three-dimensional image output device according to any one of the eighth to the eleventh aspects, wherein the parallax amount adjusting device includes a plurality of conversion tables, the input-output relationships represented by the conversion tables being different from each other, and the parallax amount adjusting device selects one of the conversion tables depending on a size of a display device used for stereoscopic display or a visual distance from among the plurality of conversion tables.

The thirteenth aspect of the presently disclosed subject matter provides the three-dimensional image output device according to any one of the first to the twelfth aspects, further including a display information acquiring device for acquiring display information of a display device used for stereoscopic display, the information including at least size information of the display device, and wherein the parallax amount adjusting device performs adjustment of a parallax amount corresponding to the display information, based on the display information acquired by the display information acquiring device.

According to this, the parallax image corresponding to the characteristic of stereoscopic display of the display device can be generated in accordance with the kind of the display device in use for stereoscopic display.

The fourteenth aspect of the presently disclosed subject matter provides a three-dimensional image output method including: a viewpoint image acquiring step of acquiring a plurality of viewpoint images obtained by photographing a same subject from a plurality of viewpoints; a parallax information acquiring step of acquiring parallax amounts in a plurality of sets of feature points at which features substantially correspond to one another from the acquired plurality of viewpoint images; a parallax amount adjusting step of adjusting the parallax amount of each of the acquired feature points, and performing adjustment of assigning different weights to the parallax amounts in accordance with values of the parallax amounts; a parallax image generating step of generating a parallax image corresponding to the parallax amount of each of the feature points after the adjustment; and a parallax image output step of outputting a plurality of parallax images including the generated parallax image.

The fifteenth aspect of the presently disclosed subject matter provides the three-dimensional image output method according to the fourteenth aspect, wherein, in the parallax information acquiring step, a plurality of parallax amounts including a foreground representative parallax amount representing a parallax amount of a feature point which is nearest to a prescribed viewpoint at which one of the viewpoint images are taken, and a background representative parallax amount representing a parallax amount of a feature point which is farthest from the prescribed viewpoint, are acquired.

The sixteenth aspect of the presently disclosed subject matter provides the three-dimensional image output method according to the fourteenth or the fifteenth aspect, wherein, in the parallax amount adjusting step, a plurality of parallax amounts acquired in the parallax information acquiring step are classified into at least three kinds of parallax amounts, the parallax amounts including a parallax amount of a near feature point, a parallax amount of a far feature point, and a parallax amount in a feature point other than the near feature point and the far feature point, and adjustment of a parallax amount of assigning a different weight to each of the classified parallax amounts is performed.

The seventeenth aspect of the presently disclosed subject matter provides the three-dimensional image output method according to the sixteenth aspect, further including a display information acquiring step of acquiring display information of a display device used for stereoscopic display, the information including at least size information of the display device, and wherein the parallax amount adjusting step includes steps of: selecting any one of a first parallax amount adjustment and a second parallax amount adjustment based on the acquired display information, the first parallax amount adjustment performing weighting adjustment for a parallax amount of a near feature point to make the parallax amount larger, and performing weighting adjustment for a parallax amount of a far feature point to make the parallax amount smaller, and the second parallax amount adjustment performing weighting adjustment for the parallax amount of a near feature point to make the parallax amount smaller, and performing weighting adjustment for the parallax amount of a far feature point to make the parallax amount larger; and adjusting a parallax amount by the selected parallax amount adjustment.

According to this, in correspondence with the kind of a display device in use for stereoscopic display, a parallax image corresponding to the characteristic of stereoscopic display of the display device can be generated.

Advantageous Effects of Invention

According to the presently disclosed subject matter, the parallax amounts among a plurality of parallax images of the foreground and background which occur due to perspective of a subject are adjusted by assigning weights in accordance with the parallax amounts. Therefore, a parallax image with a desired intensity being given to the parallaxes of the foreground and background can be generated, and a parallax image with more preferable stereoscopic vision can be outputted.

BRIEF DESCRIPTION OF THE DRAWINGS

FIG. 10 is a diagram illustrating an example of parallax amount metadata in the 3D image file for 3D image;

FIG. 11 is a table illustrating an example of a representative parallax amount of each viewpoint;

FIG. 12 is a diagram illustrating another example of the parallax amount metadata in the 3D image file for 3D image;

DESCRIPTION OF EMBODIMENTS

Hereinafter, embodiments of a three-dimensional image output device and a three-dimensional image output method according to the presently disclosed subject matter will be described in accordance with the attached drawings.

[First Embodiment of Three-Dimensional Image Output Device]

Figure 1:
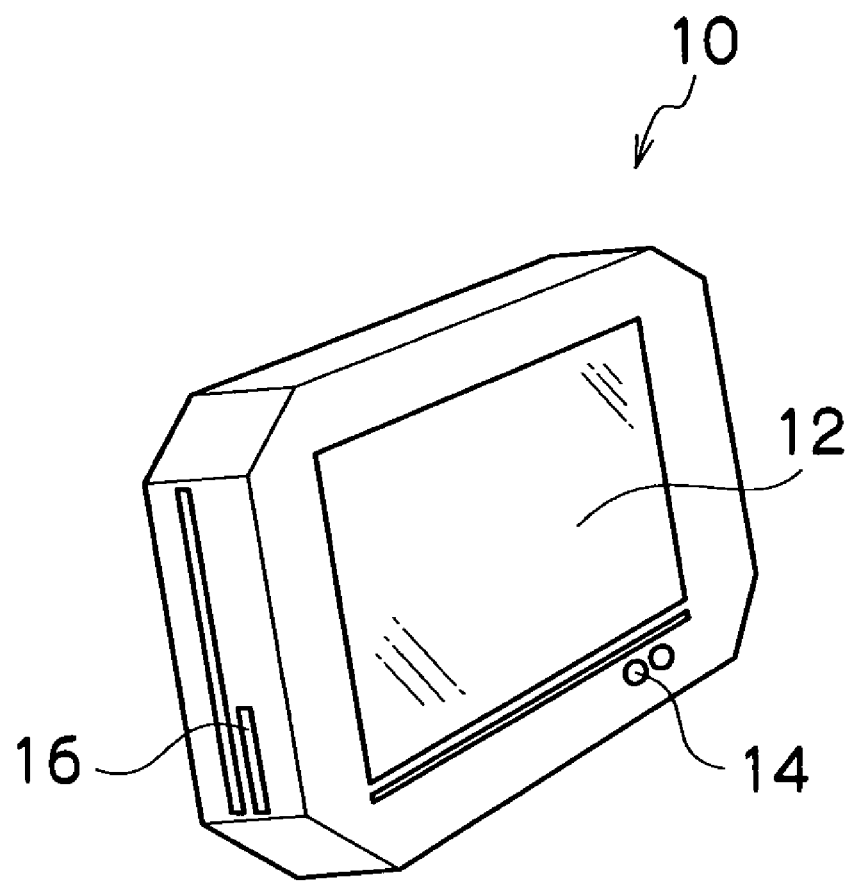
FIG. 1 is an external view illustrating a three-dimensional image output device of a first embodiment of the presently disclosed subject matter.

FIG. 1 is an external view illustrating a three-dimensional image output device of a first embodiment of the presently disclosed subject matter.

As shown in FIG. 1, a three-dimensional image output device (3D image output device) 10 is a digital photo frame loaded with a color three-dimensional liquid crystal display (hereinafter, called "3D LCD") 12. An operation section 14 for selecting a power supply switch display mode including normal display and slide show is provided on a front surface thereof, and a memory card slot 16 is provided on a side surface thereof.

Figure 2:
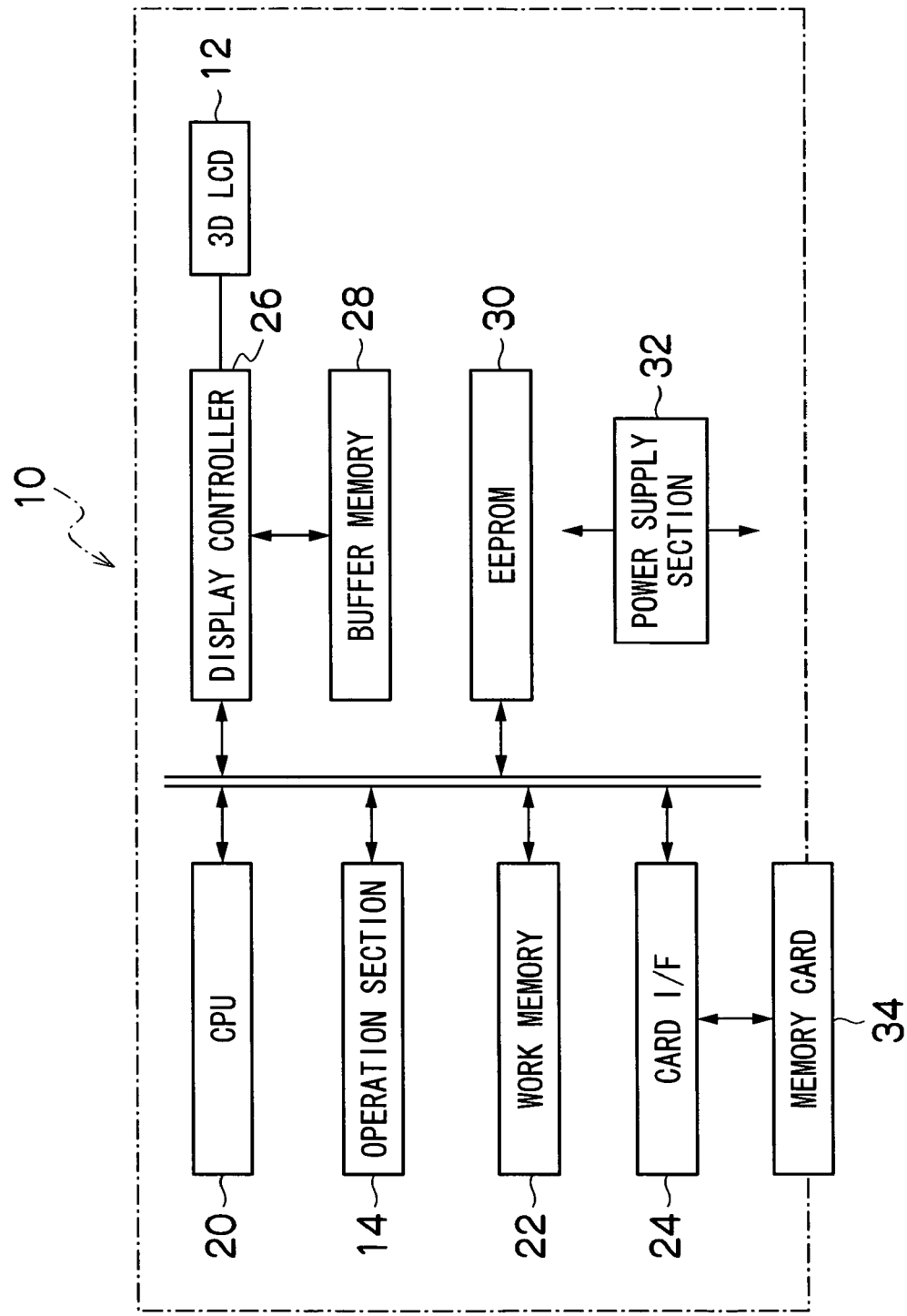
FIG. 2 is a block diagram illustrating an internal configuration of the three-dimensional image output device shown in FIG. 1.

FIG. 2 is a block diagram illustrating an internal configuration of the above described 3D image output device 10.

As shown in FIG. 2, the 3D image output device 10 includes a central processing unit (CPU) 20, a work memory 22, a card interface (card I/F) 24, a display controller 26, a buffer memory 28, an EEPROM 30 and a power supply section 32 in addition to the above described 3D LCD 12 and the operation section 14. The operation section includes a power supply switch and operation switches.

The 3D LCD 12 is the one that displays a plurality of parallax images (an image for a right eye, an image for a left eye) as directional images having predetermined directivities by a lenticular lens, a parallax barrier or the like, the one that allows viewers to see images for right eyes and images for left eyes individually by wearing exclusive spectacles such as polarizing spectacles and liquid crystal shutter spectacles, and the like.

The CPU 20 performs centralized control of the operation of the entire 3D image output device 10 in accordance with a predetermined control program based on input from the operation section 14. The control contents by the CPU 20 will be described later.

The work memory 22 includes a calculating operation region of the CPU 20 and a temporary storage region of image date.

The card I/F 24 is a unit for transmitting and receiving data (image data) to and from the memory card 34 by being electrically connected to the memory card 34 when the memory card 34 which is a recording medium of a digital camera is fitted in the memory card slot 16.

The display controller 26 repeatedly reads image data (plurality of image data) for 3D display from the buffer memory 28 which is a temporary storage region exclusive for image data for display, converts the data into signals for 3D display in the 3D LCD 12 and outputs the signals to the 3D LCD 12. Thereby, the display controller 26 causes the 3D LCD 12 to display a 3D image.

The power supply section 32 controls power from a battery or a commercial power supply not illustrated, and supplies the operating power to each part of the 3D image output device 10.

[Operation of 3D Image Output Device 10]

When the power supply switch of the operation section 14 is turned on, and slide show reproduction is set as a reproduction mode, the CPU 20 reads image files at predetermined intervals in the sequence of the file number via the card I/F 24 from the memory card 34 fitted in the memory card slot 16. The image file is such a 3D image file for 3D display that a plurality of parallax images are stored in one file, and the details of the data structure of the 3D image file will be described later.

The CPU 20 acquires a plurality of parallax images, the coordinate values of a plurality of sets of feature points at which the features correspond to one another on a plurality of the parallax images, and the parallax amounts which are the differences of the coordinate values of the plurality of sets of feature points from the read 3D image file. When the appendix information of the 3D image file does not include the coordinate values of the above described plurality of sets of feature points and the like, the CPU 20 analyzes a plurality of parallax images and acquires the coordinate value of each of the feature points. In the present embodiment, when the CPU 20 acquires the parallax amount, the CPU 20 selects a reference image from among the plurality of parallax images. And then, the CPU 20 calculates the difference between the reference image and the other parallax image other than the reference image by subtracting the coordinate value of each of the feature points in the reference image from the coordinate value of each of the corresponding feature points in the other parallax image. The parallax amount can be calculated by subtracting the coordinate value of each of the corresponding feature points in the other parallax image from the coordinate value of each of the feature points in the reference image.

Figure 3:
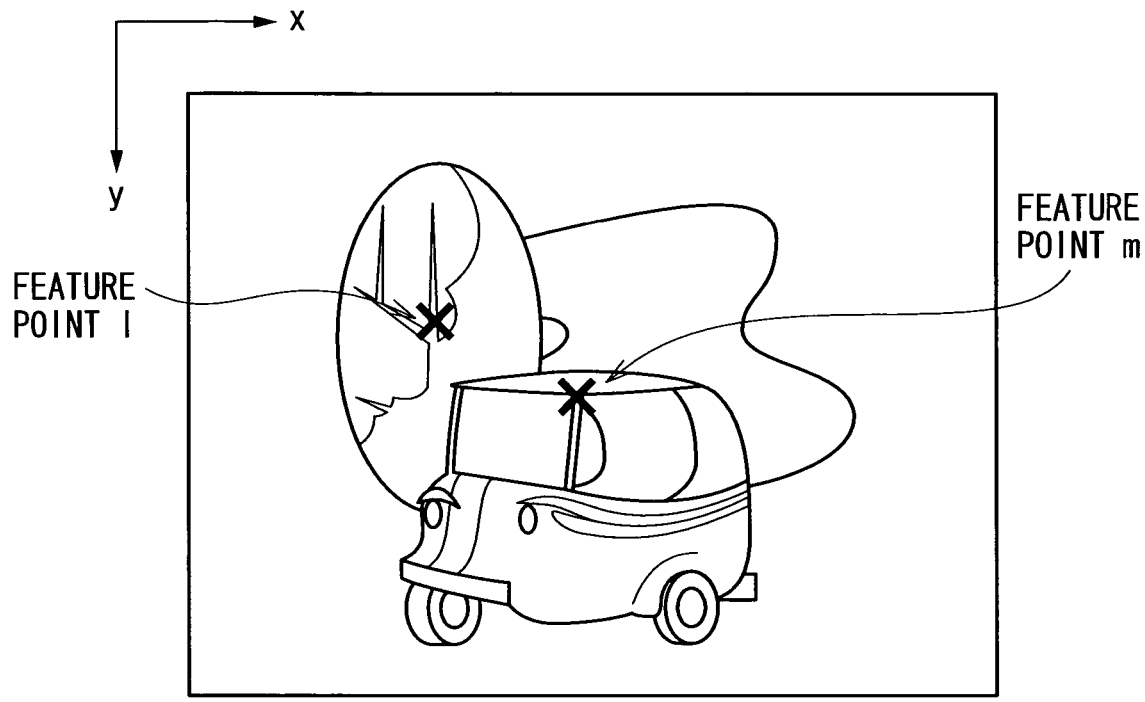
FIG. 3 is a view illustrating examples of feature points in an image.

Here, the feature points are the feature points l and m which have the features that can be uniquely identified in the parallax image as shown in FIG. 3, and are such that the same feature points "l" and "m" can be identified between the parallax image and the other parallax images.

Figure 4:
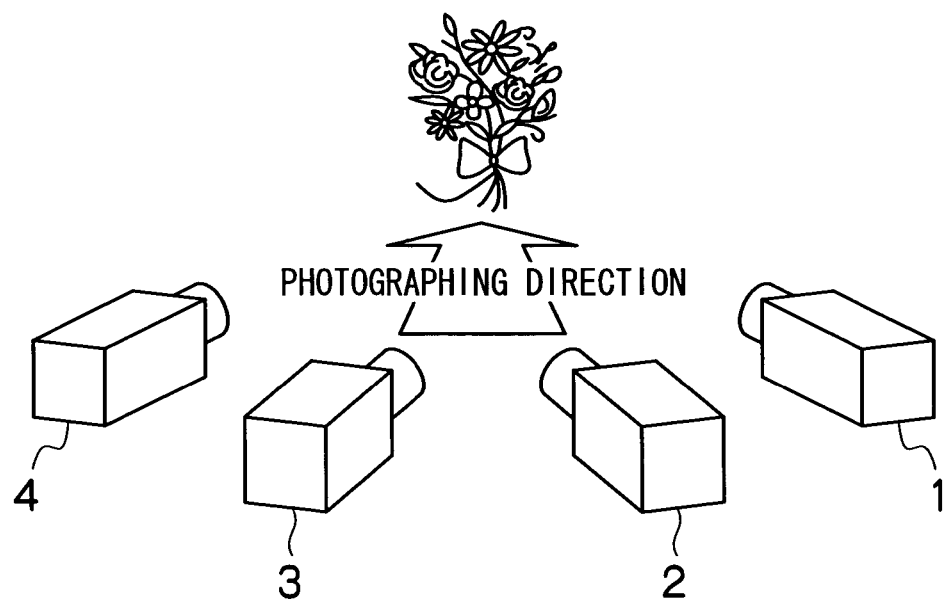
FIG. 4 is a view illustrating a plurality of imaging units and examples of assignment of viewpoint numbers.

As shown in FIG. 4, four parallax images of a subject are photographed from four viewpoints. The four viewpoints are indicated by the viewpoint numbers "1" to "4", respectively.

Figures 5, 6:
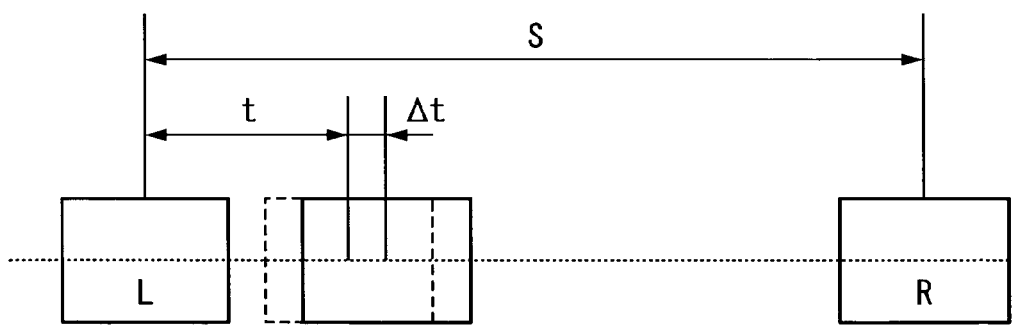
FIG. 5 illustrates examples of coordinate values of feature points "l" and "m" of four parallax images photographed from the respective viewpoints.
FIG. 6 illustrates relationship of a virtual viewpoint position and a parallax adjustment parameter $\Delta t$.

As shown in FIG. 5, the coordinate values of the same feature points "l" and "m" in the four parallax images photographed from the four viewpoints have different values respectively. In the example shown in FIG. 5, the x coordinate value of the feature point l becomes smaller as the viewpoint number becomes larger (as the viewpoint position moves toward the left side as shown in FIG. 4), and the x coordinate value of the feature point m becomes larger as the viewpoint number becomes larger.

This is based on the fact that the subject including the feature point l is a distant view which is at the position farther than the position where the optical axes of the respective imaging sections intersect one another, and the subject including the feature point m is the foreground which is at the position nearer than the position where the optical axes of the respective imaging sections intersect one another.

For detection of the above described feature points, various methods have been conventionally proposed, and, for example, a block matching method, a KLT method (Tomasi & Kanade, 1991, Detection and Tracking of Point Features), an SIFT (Scale Invariant Feature Transform) and the like can be used. Further, a face detecting technique of recent years can be applied for detection of the feature points.

As the feature points in the parallax images, all the points at which the feature can be uniquely identified among a plurality of parallax images are desirably taken.

When a block matching method is applied for detection of the feature points at which the features correspond to one another among a plurality of parallax images, the correspondence of the block of a predetermined block size which is cut out from one image (for example, a left image) of a plurality of parallax images with an arbitrary pixel as a reference, and the block of another parallax image (for example, a right image) out of a plurality of parallax images is evaluated, and the reference pixel of the block of the right image when the correspondence of the blocks becomes the maximum is set as the pixel of the another parallax image (the right image) corresponding to the arbitrary pixel of the aforementioned left image.

There is, for example, a method using a square sum (SSD: Sum of Square Difference) of luminance difference of the pixels in respective blocks as the function for evaluating the degree of coincidence (correspondence) among the blocks in the block matching method ("SSD" block matching method).

In the SSD block matching method, calculation of the following expression is performed with respect to each of pixels f(i, j) and g(i, j) in the blocks of both the images.

$$SSD = \sum_i \sum_j \{f(i, j) - g(i, j)\}^2 \quad \text{[Expression 1]}$$

Calculation of the above described expression of [Expression 1] is performed while the position of the block is moved in a predetermined search region on the right image, and the pixel at the position in the search region when the SSD value becomes the minimum is made the pixel of the search object.

The parallax indicating the deviation amount (amount of displacement) and the deviation direction (direction of displacement) between the position of the pixel on the left image and the corresponding searched pixel on the right image (when the left and right images are photographed in a horizontal state that the viewpoints are located along the horizontal direction, the deviation direction can be expressed by a coordinate value with positive and negative signs on an axis along the horizontal direction) is obtained.

<First Example of Adjustment of Parallax Amount>

Next, a first example of an adjustment method of a parallax amount according to the presently disclosed subject matter will be described.

The CPU 20 adjusts the parallax amount of the feature point of each set of feature points which is acquired. Specifically, the CPU 20 determines a weighting factor for the parallax amount, based on the parallax amount.

Now, when the distance between the viewpoints of two parallax images (an image "R" for a right eye, an image "L" for a left eye) is set as "S" as shown in FIG. 6, a parallax amount d'(x, y) of an arbitrary feature point on an image (virtual viewpoint image) shown by the dotted line photographed at the virtual viewpoint (viewpoint at a distance t from the viewpoint of the image L for a left eye) can be expressed by the following expression.

$$d'(x, y) = \frac{t}{s} d(x, y) \quad \text{[Expression 2]}$$

Here, d(x, y) is a parallax amount between the image R for a right eye and the image L for a left eye of the above described arbitrary feature point.

The invention described in PTL1 adjusts the parallax amount d(x, y) by determining the position of the virtual viewpoint as described above, and obtaining the parallax amount d'(x, y) at the virtual viewpoint position.

In contrast with this, in the example of the presently disclosed subject matter, the parallax amount is adjusted by calculating the parallax amount d'(x, y) of an arbitrary feature point at the virtual viewpoint position by the following expression.

$$d'(x, y) = \frac{t + \Delta t}{S} d(x, y) \quad \text{[Expression 3]}$$

Figure 7:
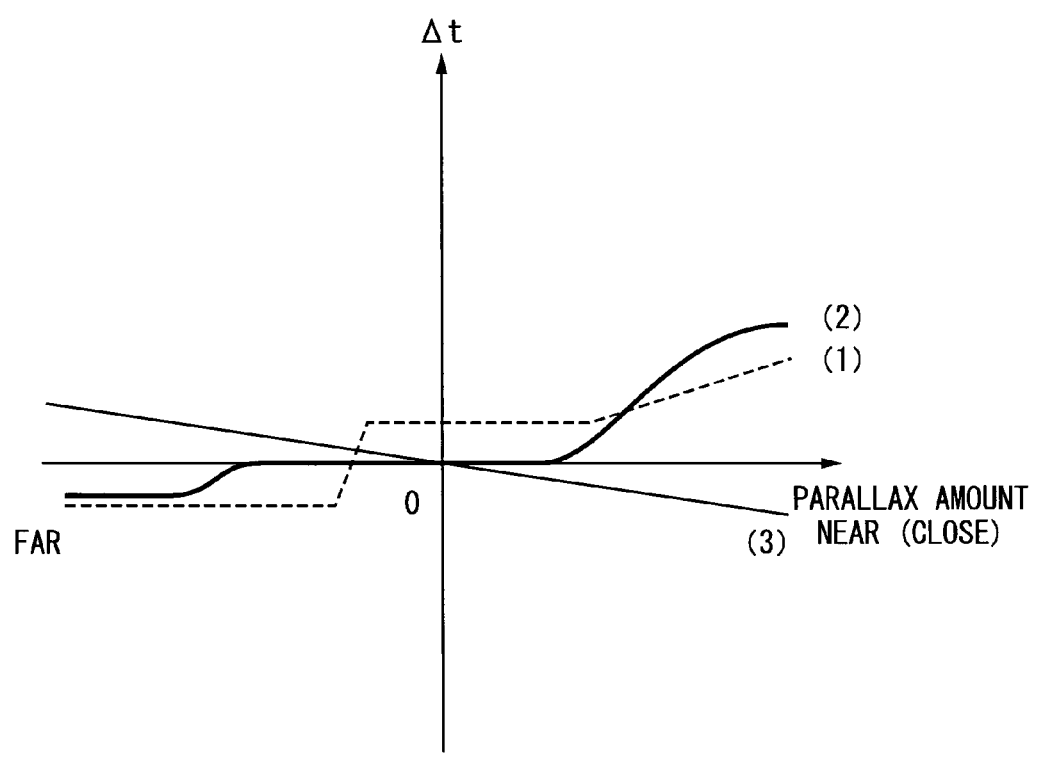
FIG. 7 is a graph illustrating an example of a parallax adjustment parameter $\Delta t$.

Here, Δt represents a parallax adjustment parameter for adjusting the position of the virtual viewpoint, and is the function of the parallax amount of the feature point as shown in graphs (1), (2) and (3) of FIG. 7. By the parallax adjustment parameter Δt, the position of the above described virtual viewpoint is adjusted as shown by the dashed line.

What the above described expression of [Expression 3] means is that when the position of the virtual viewpoint is further adjusted by the parallax adjustment parameter Δt, if, for example, the position of the virtual viewpoint is adjusted by the parallax adjustment parameter Δt so that t becomes large, the parallax amount d'(x, y) becomes larger as compared with that before adjustment, and if the position of the virtual viewpoint is adjusted by the parallax adjustment parameter Δt so that t becomes small on the contrary, the parallax amount d'(x, y) becomes smaller as compared with that before adjustment.

Further, the parallax adjustment parameter Δt shown in the graphs (1) and (2) of FIG. 7 shows the tendency to take a larger value in the positive direction as the parallax amount is larger (nearer to a foreground (a prescribed viewpoint or a camera)), and to take a larger value in the negative direction as the parallax amount is larger in the negative direction (nearer to a background (farther from the prescribed viewpoint or a camera)). Here, the prescribed viewpoint can be a centrally-positioned viewpoint or a substantially centrally-positioned viewpoint among the plurality of viewpoints when the plurality of viewpoints are arranged along a direction. Also, the prescribed viewpoint can be a viewpoint where a photographing unit for photographing the reference image is located, the reference image used as a reference of the parallax amount calculation. The parallax adjustment parameter Δt shown in the graph (3) of FIG. 7 tends to take a larger value in the negative direction as the parallax amount is larger in the positive direction, and to take a larger value in the positive direction as the parallax amount is larger in the negative direction, contrary to the above described graphs (1) and (2).

The CPU 20 reads the conversion table corresponding to any graph out of the above described graphs (1), (2) and (3) in accordance with the display section information including at least size information of the 3D LCD 12 from the EEPROM 30, reads the parallax adjustment parameter Δt corresponding to the parallax amount of the feature point at each of the feature points in the parallax image, and calculates the parallax amount d'(x, y) by the above described expression of [Expression 3]. The position of the virtual viewpoint can be determined by the information such as the viewpoint image size, the parallax information relating to the parallax among the viewpoint images, and the size of the stereoscopic display device as in the invention described in PTL1.

Now, when the parallax image for a right eye is set as the reference image, and the parallax image after parallax adjustment is generated from the parallax image for a left eye, the parallax image for a left eye is geometrically transformed so that the coordinate value of each of the feature points of the parallax image for a left eye becomes the coordinate value having the parallax amount after the aforementioned adjustment based on the parallax amount of each of the feature points of the parallax image for a left eye with respect to the reference image, and a parallax amount obtained by adjusting the parallax amount by the above described expression of [Expression 3]. The geometrical transformation can be performed by projective transformation using a projective transformation parameter, affine transformation using an affine transformation parameter, a Helmert transformation using a Helmert transformation parameter and the like.

The parallax image for a left eye which is generated by the CPU 20 is outputted to the buffer memory 28, and is temporarily stored in the buffer memory 28 together with the parallax image for a right eye (reference image).

The display controller 26 reads two parallax images (an image for a right eye and an image for a left eye) from the buffer memory 28, converts them into signals for 3D display, and outputs the signals to the 3D LCD 12. Thereby, the 3D LCD 12 is caused to display the 3D image (left and right parallax images).

The 3D image output device 10 of this embodiment is a digital photo frame loaded with the 3D LCD 12. However, the presently disclosed subject matter is not limited to this, and is also applicable to stereoscopic display devices having various screen sizes, different kinds of stereoscopic display devices such as a 3D plasma display and a 3D organic EL (electroluminescence) display, and a 3D image output device which outputs a parallax image to a printer or the like which generates stereoscopic display print. In this case, it is preferable to acquire the display section information including at least size information of the display section out of the information regarding the display section in use for stereoscopic display and adjust the parallax amount based on the display section information.

For example, in the case of a stereoscopic display device with a small display size, the parallax adjustment parameter Δt is obtained from the conversion table corresponding to the graphs (1) and (2) of FIG. 7, and the parallax image is generated so that the parallax amount is equal to the parallax amount adjusted by the parallax adjustment parameter Δt, whereby a stereoscopic image with the foreground seeming to pop up more forward while a sense of depth of the background is suppressed (stereoscopic image with impactful stereoscopic vision) can be displayed.

Meanwhile, in the case of a stereoscopic display device with a large display size, the parallax adjustment parameter Δt is obtained from the conversion table corresponding to the graph (3) of FIG. 7, and the parallax image is generated so that the parallax amount becomes the parallax amount adjusted by the parallax adjustment parameter Δt, whereby a stereoscopic image with the popping-up amount of the foreground being suppressed and the sense of depth of the background being emphasized (stereoscopic image with soft stereoscopic vision) can be displayed.

[Second Embodiment of Three-Dimensional Image Output Device]

Figure 8A:
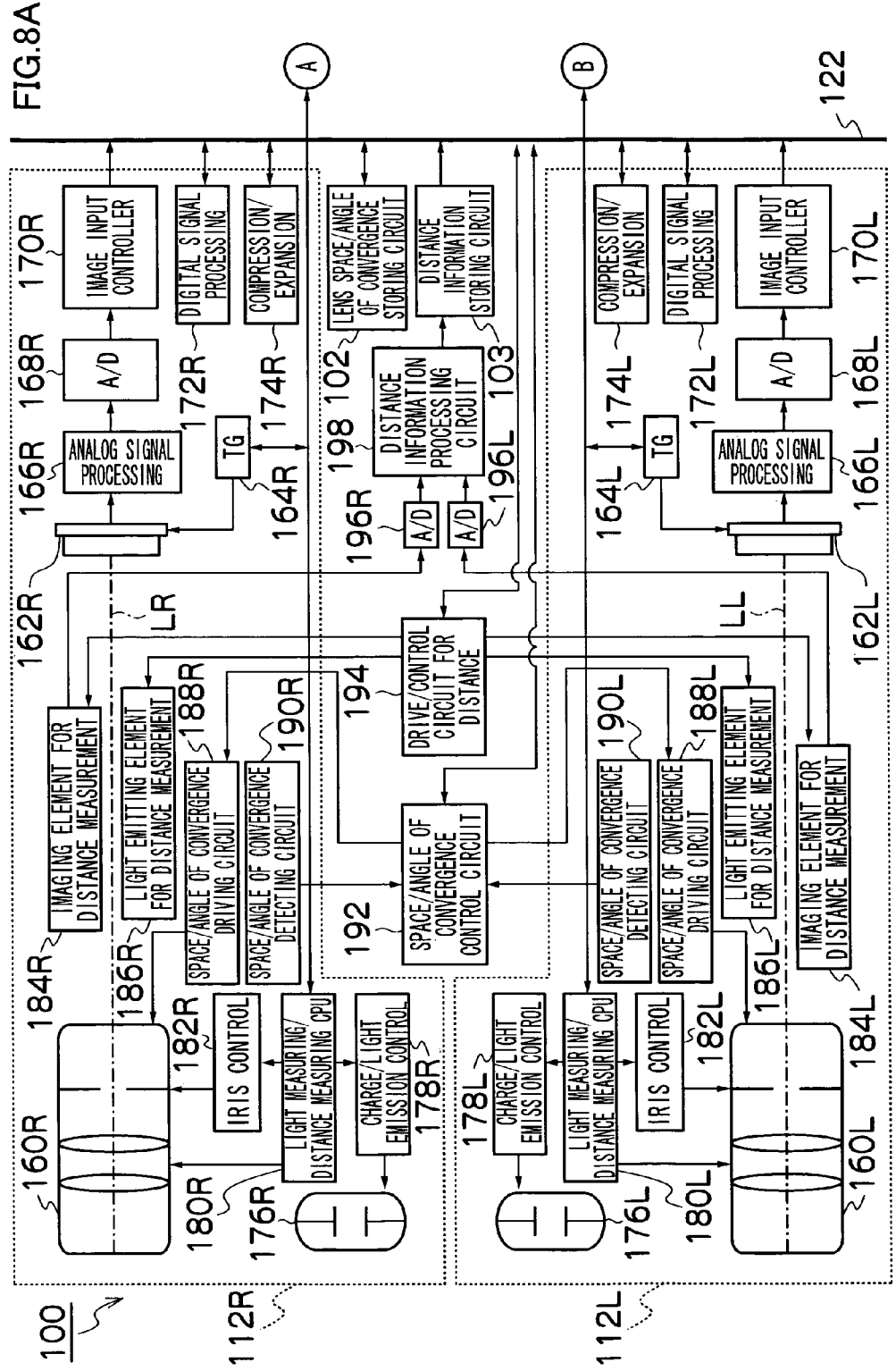
FIGS. 8A and 8B are block diagrams illustrating an internal configuration of a digital camera including the 3D image output device according to the presently disclosed subject matter.
Figure 8B:
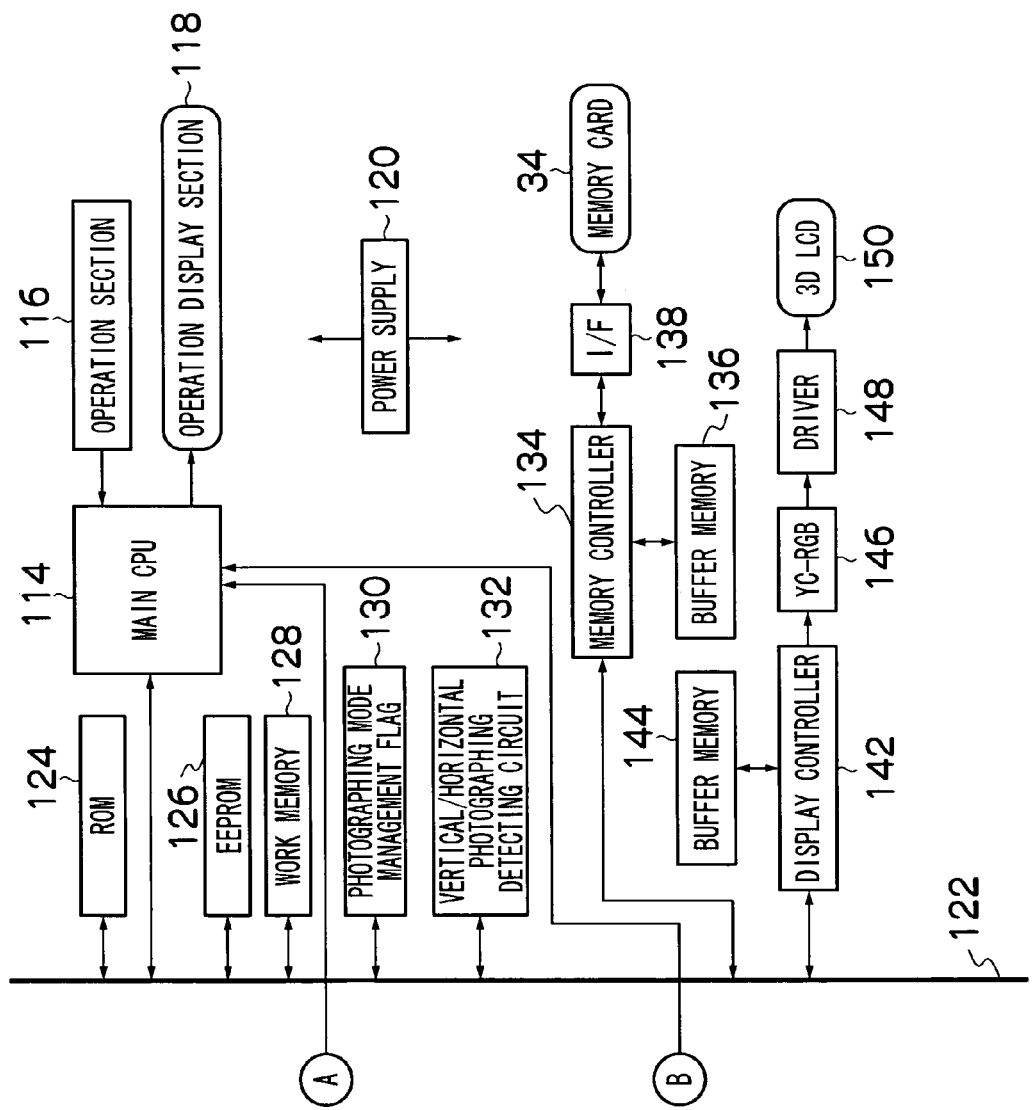

FIGS. 8A and 8B are block diagrams illustrating an internal configuration of a digital camera 100 including the 3D image output device according to the presently disclosed subject matter.

As shown in FIGS. 8A and 8B, the digital camera 100 is a compound eye camera including two photographing units 112R and 112L. The number of the photographing units 112 can be two or more.

The digital camera 100 can record a 3D image composed of a plurality of images photographed by a plurality of photographing units 112R and 112L as one 3D image file for 3D display.

A main CPU 114 (hereinafter, called "CPU 114") performs centralized control of the operation of the entire digital camera 100 in accordance with a predetermined control program based on input from an operation section 116.

A ROM 124, an EEPROM 126 and a work memory 128 are connected to the CPU 114 via a system bus 122. The ROM 124 stores a control program executed by the CPU 114 and various data necessary for control. The EEPROM 126 stores various kinds of setting information and the like regarding the operation of the digital camera 100 such as user setting information. The work memory 128 includes a region for a calculating operation of the CPU 114 and a temporary storage region of image data.

The operation section 116 receives inputs concerning various operations from a user, and includes a power supply/mode switch, a mode dial, a release switch, a cross key, a zoom button, a MENU/OK button, a DISP button and a BACK button. The operation display section 118 displays the result of the operation input from the operation section 116, and includes, for example, a liquid crystal panel or a light emitting diode (LED).

The power supply/mode switch receives an input for switching on/off of the power supply of the digital camera, and switching the operation modes (a reproduction mode and a photographing mode) of the digital camera 100. When the power supply/mode switch is turned on, supply of electric power to each of the parts of the digital camera 100 from a power supply section 120 is started, and various operations of the digital camera 100 are started. Further, when the power supply/mode switch is turned off, supply of power to each of the parts of the digital camera 100 from the power supply section 120 is stopped.

A mode dial receives an input for switching the photographing mode of the digital camera 100, and can switch the photographing mode among a 2D still image photographing mode for photographing a still image of 2D, a 2D moving image photographing mode for photographing a moving image of 2D, a 3D still image photographing mode for photographing a still image of 3D, and a 3D moving image photographing mode for photographing a moving image of 3D. When the photographing mode is set to the 2D still image photographing mode or the 2D moving image photographing mode, a flag indicating that the photographing mode is the 2D mode for photographing a 2D image is set to a photographing mode management flag 130. When the photographing mode is set to the 3D still image photographing mode or the 3D moving image photographing mode, the flag indicating that the photographing mode is a 3D mode for photographing a 3D image is set to the photographing mode management flag 130. The CPU 114 refers to the photographing mode management flag 130, and discriminates setting of the photographing mode.

The release switch is constituted of a two-stage stroke type switch configured by, so-called "half press" and "full press". At the time of the still image photographing mode, when the release switch is half-pressed, photographing preparation processing (for example, AE (Automatic Exposure) processing, AF (Auto Focus) processing, and AWB (Automatic White Balance processing) are performed, and when the release switch is fully pressed, photographing/recording processing of a still image is performed. At the time of the moving image photographing mode, when the release switch is fully pressed, photographing of a moving image is started, and when the release switch is fully pressed again, photographing of the moving image is finished. A release switch for photographing a still image and a release switch for photographing a moving image can be separately provided.

A 3D LCD 150 is a 3D image display similar to the 3D LCD 12 of the 3D image output device 10 shown in FIG. 1, which functions as an image display section for displaying a photographed 2D image or 3D image, and also functions as a GUI at the time of various settings. Further, the 3D LCD 150 also functions as an electronic finder for checking an angle of view at the time of a photographing mode.

A vertical/horizontal photographing detecting circuit 132 includes a sensor for detecting the orientation of the digital camera 100, for example, and inputs the detection result of the orientation of the digital camera 100 in the CPU 114. The CPU 114 performs switching of vertical photographing and horizontal photographing in the case of the orientation of the digital camera 100.

Next, the photographing function of the digital camera 100 will be described. In FIGS. 8A and 8B, each of the components in the photographing unit 112R is assigned with reference character R, and each of the components in the photographing unit 112L is assigned with reference character L so that the respective components can be discriminated. However, since the corresponding components in the photographing units 112R and 112L have substantially the same functions, the components will be described by omitting the reference characters R and L in the following description.

A photographing lens 160 includes a zoom lens, a focus lens and an iris. The zoom lens and the focus lens moves forward and backward along the optical axis of each of the photographing units (LR and LL in the drawing). The CPU 114 controls drive of a zoom actuator not illustrated via a light measuring/distance measuring CPU 180, and thereby, controls the position of the zoom lens to perform zooming. The CPU 114 controls drive of a focus actuator via the light measuring/distance measuring CPU 180, and thereby, controls the position of the focus lens to perform focusing. Further, the CPU 114 controls drive of an iris actuator via the light measuring/distance measuring CPU 180, and thereby, controls an aperture amount (iris value) of the iris to control the incident light amount on an imaging element 162.

In the case of photographing a plurality of images at the time of the 3D mode, the CPU 114 drives the photographing lenses 160R and 160L of the respective photographing units 112R and 112L by synchronizing them. More specifically, the photographing lenses 160R and 160L are always set at the same focal length (zoom magnification). Further, the irises are adjusted so that the same incident light amount (f-number) is always obtained. Further, at the time of the 3D mode, the focal point is adjusted so that the same subject always comes into focus.

A flash light emitting part 176 is constituted of, for example, a discharge tube (xenon tube), and emits light in accordance with necessity in the case of photographing a dark subject, at the time of photographing against the light, and the like. A charge/light emission control part 178 includes a main capacitor for supplying an electric current for causing the flash light emitting part 176 to emit light. The CPU 114 transmits a flash light emission instruction to the light measuring/distance measuring CPU 180 to perform charge control of the main capacitor, control of timing and charge time of discharge (light emission) of the flash light emitting part 176 and the like. As the flash tight emitting part 176, a light emitting diode can be used.

The photographing unit 112 includes a light emitting element 186 for distance (for example, a light emitting diode) for irradiating a subject with light, and an imaging element 184 for distance for photographing an image (image for measuring distance) of the subject irradiated with light by the above described light emitting element 186 for distance.

The light measuring/distance measuring CPU 180 causes the light emitting element 186 for distance at a predetermined timing, and controls the imaging element 184 for distance to cause the imaging element 184 to photograph a distance measuring image, based on the instruction from the CPU 114.

The distance measuring image photographed by the imaging element 184 for distance is converted into digital data by an A/D converter 196 and is inputted in a distance information processing circuit 198.

The distance information processing circuit 198 calculates a distance (subject distance) between the subject photographed by the photographing units 112R and 112L and the digital camera 100 based on the principle of so-called triangulation by using the distance measuring image acquired from the imaging element 184 for distance. The subject distance calculated by the distance information processing circuit 198 is recorded in a distance information storing circuit 103.

As the calculating method of the subject distance, a TOF (Time of Flight) method for calculating a subject distance from the flight time of light (delay time) and the speed of light after the light emitting element 186 for distance emits light until the light irradiated by the light emitting element 186 for distance is reflected by the subject and reaches the imaging element 184 for distance can be used.

Further, the photographing unit 112 includes a space/angle of convergence driving circuit 188 and a space/angle of convergence detecting circuit 190.

The space/angle of convergence driving circuits 188R and 188L respectively drive the photographing units 112R and 112L. The CPU 114 operates the space/angle of convergence driving circuits 188R and 188L via the space/angle of convergence control circuit 192 to adjust the space and angle of convergence of the photographing lenses 160R and 160L.

The space/angle of convergence detecting circuits 190R and 190L transmits and receives radio wave, for example. The CPU 114 operates the space/angle of convergence detecting circuits 190R and 190L via the space/angle of convergence control circuit 192 to transmit and receive radio wave to and from each other, and thereby, measures the space and the angle of convergence of the photographing lenses 160R and 160L. The measurement results of the space and the angle of convergence of the photographing lenses 160R and 160L are stored in a lens space/angle of convergence storing circuit 102.

The imaging element 162 is constituted by, for example, a color CCD solid-state imaging element. A number of photodiodes are two-dimensionally arranged on the light receiving surface of the imaging element 162, and color filters of three primary colors (R, G, B) are disposed in a predetermined arrangement in each of the photodiodes.

The optical image of the subject which is formed on the light receiving surface of the imaging element 62 by the photographing lens 160 is converted into a signal charge corresponding to the incident light amount by the photodiode. The signal charge accumulated in each of the photodiodes is sequentially read from the imaging element 162 as voltage signals (R, G, B signals) corresponding to the signal charges based on drive pulses given from a TG 164 in accordance with the instruction of the CPU 114. The imaging element 162 includes an electronic shutter function, and the exposure time (shutter speed) is controlled by controlling the time of charge accumulation to the photodiodes.

As the imaging element 162, an imaging element other than a CCD, such as a CMOS sensor can be used.

An analog signal processing part 166 includes a correlated double sampling circuit (CDS) for removing reset noise (low frequency) included in the R, G and B signals outputted from the imaging element 162, and an AGS circuit for controlling the R, G and B signals to the magnitude at a fixed level by amplifying them. The analog R, G and B signals outputted from the imaging element 162 are subjected to correlated double sampling processing and amplified by the analog signal processing part 166. The analog R, G and B signals outputted from the analog signal processing part 166 are converted into digital R, G and B signals by an A/D converter 168 and are inputted in an image input controller (buffer memory) 170.

A digital signal processing part 172 includes a synchronizing circuit (processing circuit for converting a color signal into a synchronous type by interpolating a spatial deviation of the color signal, which occurs with color filter arrangement of a single plate CCD), a white balance adjustment circuit, a gray scale transformation processing circuit (gamma correction circuit), a contour correction circuit, a luminance/color-difference signal generation circuit and the like. The digital R, G and B signals which are inputted in the image input controller 170 are subjected to predetermined processing such as synchronizing processing, white balance adjustment, gray-scale transformation and contour correction, and are converted into Y/C signals configured by a luminance signal (Y signal) and a color difference signal (Cr, Cb signal) by the digital signal processing part 172.

When a live view image (through image) is displayed on the 3D LCD 150, Y/C signals generated in the digital signal processing part 172 are sequentially supplied to a buffer memory 144. The display controller 142 reads the Y/C signals supplied to the buffer memory 144 and outputs them to a YC-RGB transform unit 146. The YC-RGB transform unit 146 transforms the Y/C signals inputted from the display controller 142 into R, G and B signals and outputs them to the 3D LCD 150 via a driver 148. Thereby, a through image is displayed on the 3D LCD 150.

Here, when the mode of the camera is in the photographing mode and is the 2D mode, an image for record is photographed by a predetermined photographing unit (for example, 112R). The image photographed by the photographing unit 112R at the time of the 2D mode is compressed by a compression/expansion processing part 174R. The compressed image data is recorded in a memory card 34 as an image file of a predetermined format via the memory controller 134 and the card I/F 138. For example, a still image is recorded as a compressed image file in accordance with the JPEG (Joint Photographic Experts Group) standard, and a moving image is recorded as a compressed image file in accordance with the MPEG2 or MPEG4, H.264 standard.

When the mode of the camera is a photographing mode and a 3D mode, an image is photographed synchronously by the photographing units 112R and 112L. At the time of a 3D mode, AF processing and AE processing are performed based on the image signal acquired by any one of the photographing units 112R and 112L. The image of two viewpoints photographed by the photographing units 112R and 112L at the time of a 3D mode is compressed by the compression/expansion processing parts 174R and 174L, and is stored in one 3D image file and recorded in the memory card 34. Further, the 3D image file stores subject distance information, information regarding the space and angle of convergence of the photographing lenses 160R and 160L and the like together with the compressed image data of two viewpoints.

Meanwhile, when the operation mode of the camera is the reproduction mode, the final image file (image file which is finally recorded) which is recorded in the memory card 34 is read, and expanded to uncompressed Y/C signals by the compression/expansion processing part 174, and thereafter, inputted in the buffer memory 144. The display controller 142 reads the Y/C signals supplied to the buffer memory 144 and outputs them to the YC-RGB transform unit 146. The YC-RGB transform unit 146 transforms the Y/C signals inputted from the display controller 142 into R, G and B signals, and outputs them to the 3D LCD 150 via the driver 148. Thereby, the image file recorded in the memory card 34 is displayed on the 3D LCD 150.

Here, when the image file read from the memory card 34 is a 3D image file, the parallax image with the parallax amount being adjusted is generated as in the aforementioned 3D image output device 10, and two parallax images including a parallax image after adjustment are displayed on the 3D LCD 150.

[Data Structure of 3D Image File]

Figure 9A:
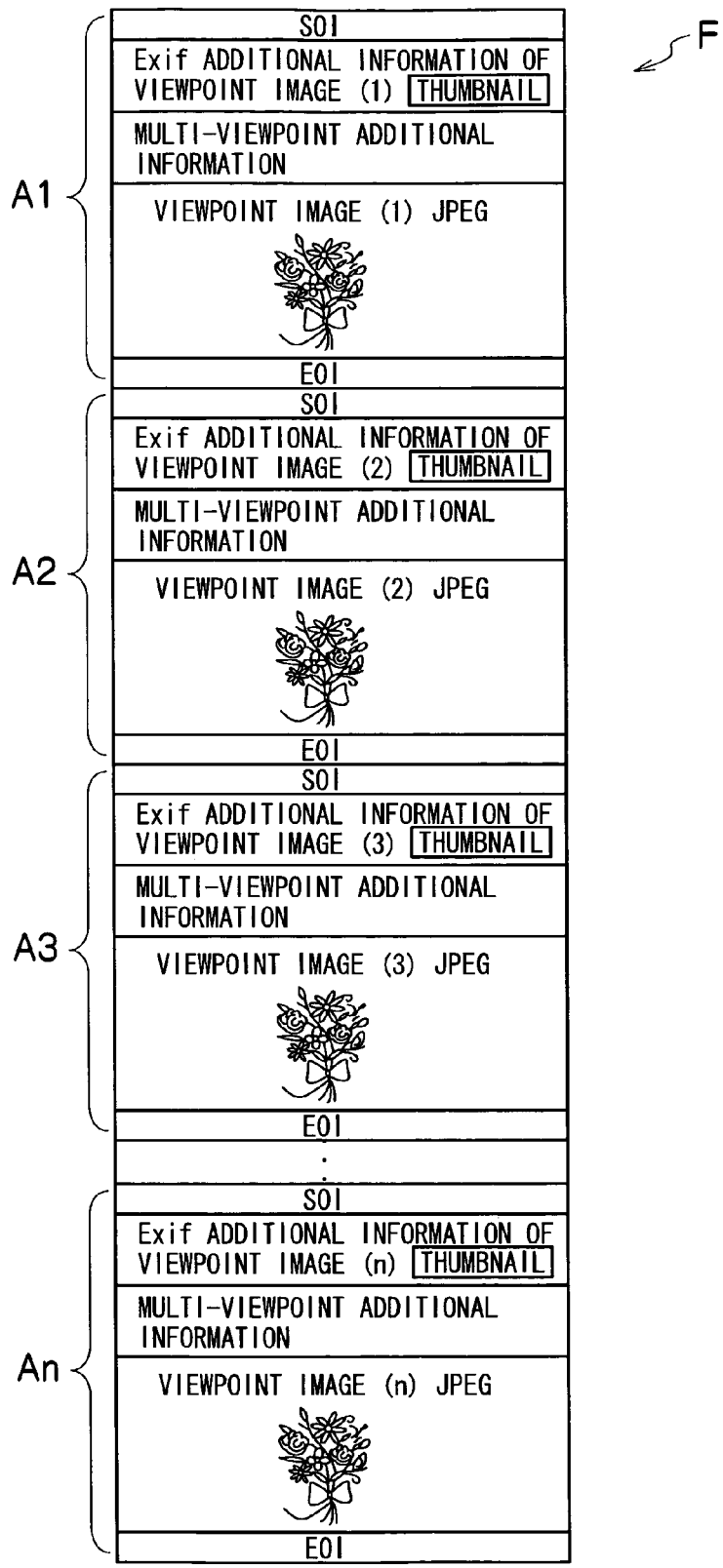
FIGS. 9A to 9D are diagrams illustrating a data structure of a 3D image file for 3D image.
Figure 9B:
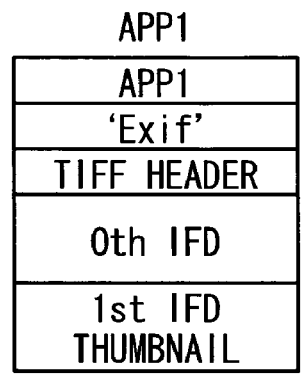
Figure 9C:
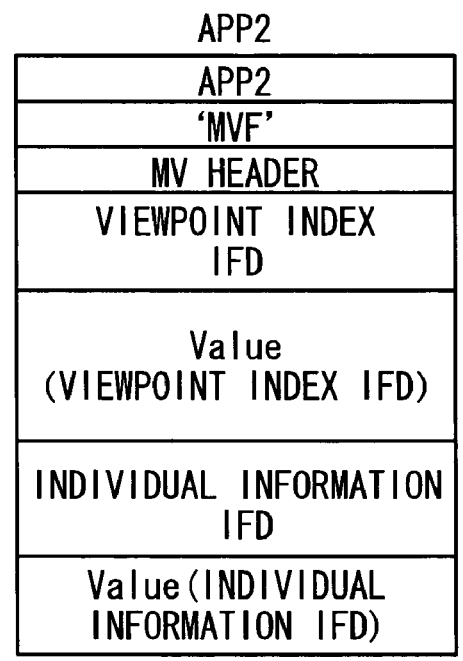
Figure 9D:
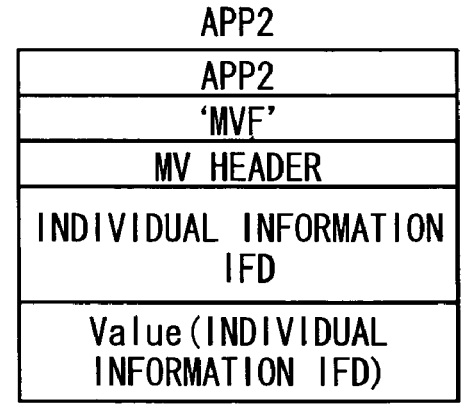

FIGS. 9A to 9D are diagrams illustrating one example of a data structure of a 3D image file for 3D display recorded in the memory card 34 by the digital camera 100. FIG. 9A is a diagram illustrating the data structure of a 3D image file. FIG. 9B is a diagram illustrating a data structure of Exif additional information of viewpoint image (1). FIG. 9C is a diagram illustrating a data structure of multi-viewpoint additional information of a viewpoint image (1) (leading image). FIG. 9D is a diagram illustrating a data structure of a diagram illustrating a data structure of multi-viewpoint additional information of a viewpoint image (2) to (n).

As shown in FIGS. 9A to 9D, a 3D image file "F" uses a file format of the Exif standard, adopts a fife format which records a plurality of images by integrating them, and is configured by a viewpoint image (1) (leading image) A1, a viewpoint image (2) A2, a viewpoint image (3) A3, . . . , and a viewpoint image (n) An being connected.

The regions of the respective viewpoint images are divided by SOI (Start of Image) illustrating a start position of each of the viewpoint images and EDI (End of Image) illustrating an end position. An APP1 marker segment in which Exif supplementary information of the viewpoint image is recorded and an APP2 marker segment in which multi-viewpoint supplementary information is recorded are provided next to the SOI, and a viewpoint image is recorded next to them.

The APP1 marker segment is provided with Exif identification information, a TIFF header, and an IFD (Image file directory) region (IMO region (0th IFD) and an IFD1 region (1st IFD)). The IFD1 region (1st IFD) stores a thumbnail image generated from the viewpoint images. Further, the APP2 marker segment includes individual information IFD.

The individual information IFD includes the number of viewpoint images, viewpoint image numbers, the angles of convergence, base line lengths and the like, and in this embodiment, as shown in FIG. 10, tag values of the reference viewpoint numbers, and the tag values of the foreground representative parallax amount and the background representative parallax amount are further recorded.

The foreground representative parallax amount is a value representing the parallax of the foreground between the reference viewpoint ("1" in the example of FIG. 10), and a viewpoint (i) of the viewpoint image, and values expressing the parallax at the time of AF focusing, the nearest-neighbor position parallax, the parallax of the center of the face recognizing position and the like can be used.

The background representative parallax amount is the value representing the parallax of the background between the reference viewpoint ("1" in the example of FIG. 10) and the viewpoint (i) of the viewpoint image, and, for example, the value expressing the smallest value (including a negative value) of the parallax amount can be used.

The examples of the numerical values of the foreground representative parallax amount and the background representative parallax amount shown in FIG. 10 show the number of pixels (negative number shows the opposite parallax direction) corresponding to the parallax amount in the lateral direction of the parallax image. Further, the number of pixels in the lateral direction of the parallax image is 1000.

FIG. 11 is a table illustrating the example of the representative parallax amounts (foreground representative parallax amount, background representative parallax amount) of each of the viewpoints in the case of four viewpoints shown in FIG. 4. Further, as shown in FIG. 12, in the individual information IFD of the 3D image file, the coordinate values of each of the feature points $1, 2, 3, \ldots, k$ in the viewpoint image are further recorded.

Extraction of the feature points among the respective parallax images, calculation of the foreground representative parallax amount and the background representative parallax amount and the like are performed by the digital camera 100, and the feature points, the foreground representative parallax amount and the background representative parallax amount are recorded as the additional information of the parallax image at the time of creation of the 3D image file.

<Second Example of Adjustment of Parallax Amount>

Figures 13, 14:
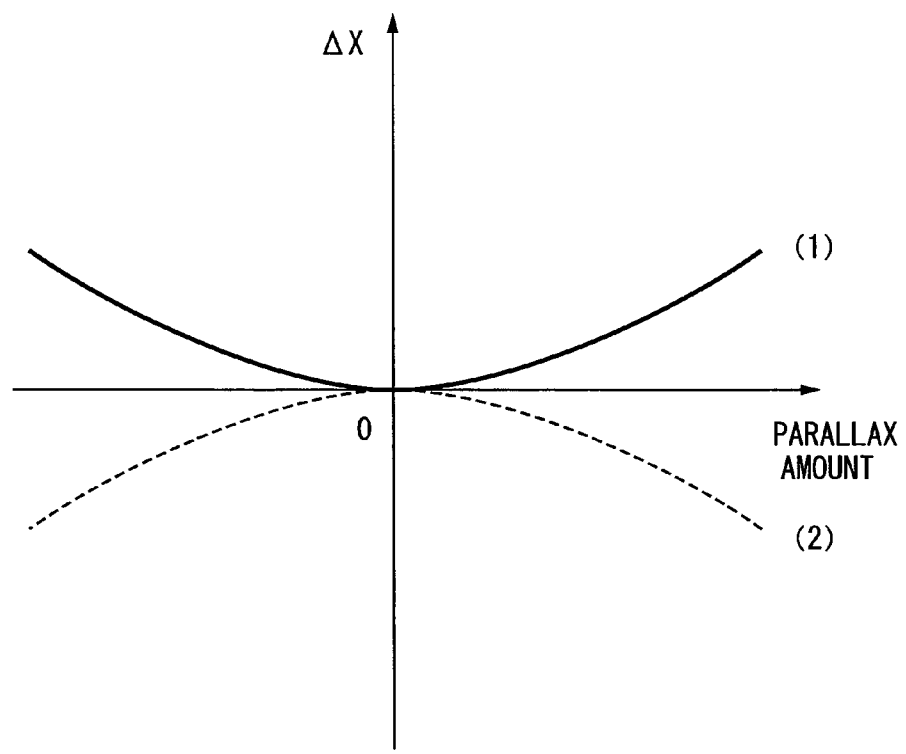
FIG. 13 is a graph illustrating one example of a parallax adjustment parameter $\Delta x$.
FIG. 14 is a table illustrating relationship of a parallax amount and a parallax adjustment parameter $\Delta x$ at each feature point.

FIG. 13 is a graph illustrating one example of a parallax adjustment parameter $\Delta x$ for adjusting a parallax amount.

The parallax adjustment parameter $\Delta t$ of the first example shown in FIG. 7 is a parameter for adjusting a virtual viewpoint position, but the parallax adjustment parameter $\Delta x$ shown in graphs (1) and (2) of FIG. 13 is a parameter for adjusting a parallax amount by being added to the parallax amount.

Now, when n of feature points are extracted from the parallax image as shown in FIG. 14, and the parallax amount is obtained according to each of the feature points, the corresponding parallax adjustment parameter $\Delta x$ is read from the conversion table corresponding to the graph (1) of FIG. 13 based on the parallax amount. According to the graph (I) of FIG. 13, the parallax amount adjustment parameter $\Delta x$ takes a larger value in the positive direction as the parallax amount is larger in the positive direction (near to the foreground), and as the parallax amount is larger in the negative direction (near to the background).

By adding the parallax adjustment parameter $\Delta x$ corresponding to the above described parallax amount to the parallax amount according to each of the feature points, the parallax amount can be adjusted.

According to the parallax adjustment parameter $\Delta x$ shown in the graph (1) of FIG. 13, the weighting adjustment for increasing the parallax amount (the parallax amount large in the positive direction) of the feature point which seems to be near is performed. Meanwhile, the weighting adjustment for decreasing the parallax amount (parallax amount which becomes larger in the negative direction) of the feature point which seems to be far is performed.

Subsequently, by generating the parallax image obtained by geometrically transforming the parallax image so as to have the feature points with the parallax amounts being adjusted as described above, the viewpoint image with the foreground seeming to pop up more forward while the sense of depth of the background is suppressed can be generated, and a stereoscopic image with more impactful stereoscopic vision can be displayed.

According to the parallax adjustment parameter $\Delta x$ of the graph (2) having the characteristic opposite from the graph (1) of FIG. 13, the parallax image with the sense of depth of the background being emphasized while the popping-up amount of the foreground is suppressed can be generated contrary to the above description, and a stereoscopic image with soft stereoscopic vision can be displayed.

<Third Example of Adjustment of Parallax Amount>

Figure 15:
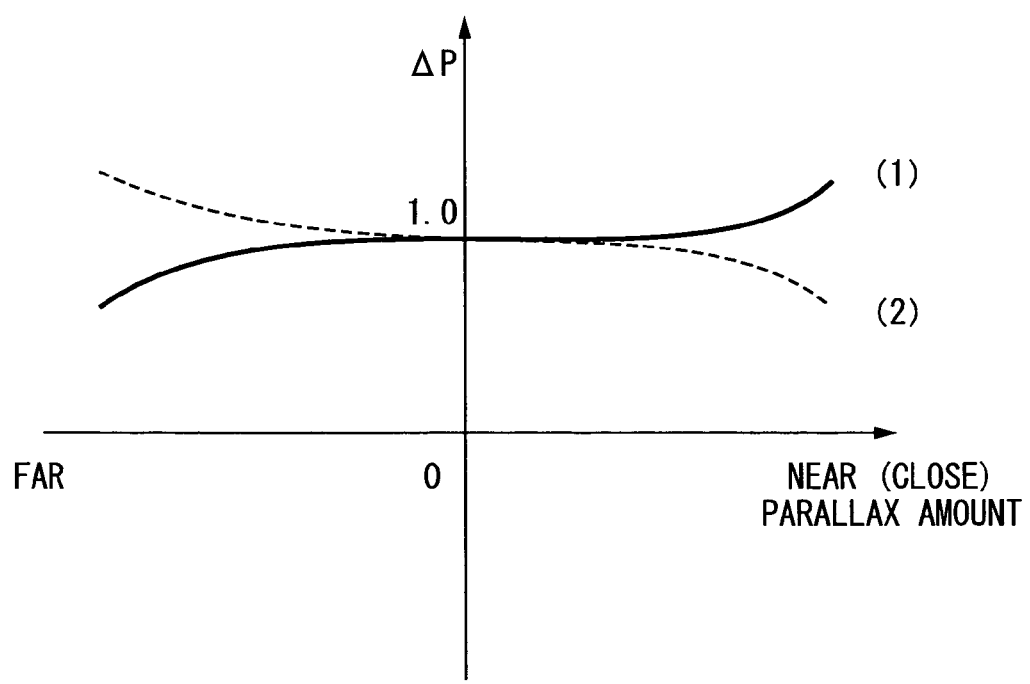
FIG. 15 is a graph illustrating one example of a parallax adjustment parameter $\Delta p$.

FIG. 15 is a graph illustrating one example of a parallax adjustment parameter $\Delta p$ for adjusting a parallax amount.

The parallax adjustment parameter $\Delta p$ shown in graphs (1) and (2) of FIG. 15 is a parameter for adjusting a parallax amount by being multiplied by the parallax amount. According to the graph (1), as the parallax amount is larger (nearer to a foreground), the parallax adjustment parameter $\Delta p$ takes a value larger than 1, and as the parallax amount is larger (nearer to a background) in the negative direction, the parallax adjustment parameter $\Delta p$ takes a value smaller than 1.

The parallax amount can be adjusted by multiplying the parallax adjustment parameter $\Delta p$ corresponding to the above described parallax amount by the parallax amount of each of the feature points.

According to the parallax adjustment parameter $\Delta p$ shown in the graph (1) of FIG. 15, weighting adjustment for increasing the parallax amount (parallax amount large in the positive direction) of the feature point, which seems to be near, is performed, whereas weighting adjustment for decreasing the parallax amount (parallax amount larger in the negative direction) of the feature point, which seems to be far, is performed, whereby the parallax image with the foreground seeming to pop up more forward while a sense of depth of the background is suppressed can be generated, and a stereoscopic image with more impactful stereoscopic vision can be displayed.

Meanwhile, according to the parallax adjustment parameter $\Delta p$ of the graph (2) having the characteristic opposite to the graph (1) of FIG. 15, the parallax image with the sense of depth of the background being emphasized while the popping-up amount of the foreground is suppressed can be generated, contrary to the above description, and a stereoscopic image with soft stereoscopic vision can be displayed.

<Fourth Example of Adjustment of Parallax Amount>

Figure 16:
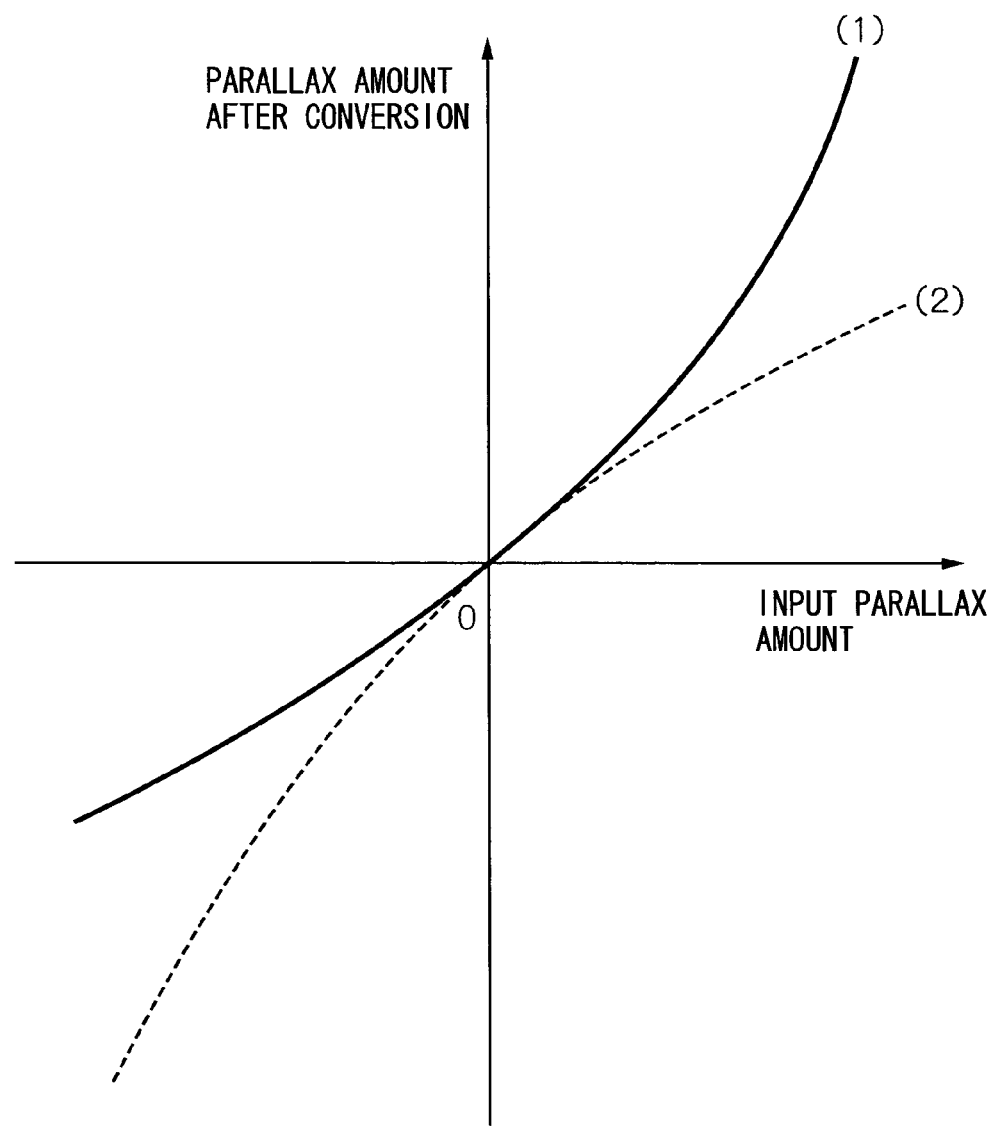
FIG. 16 is a graph illustrating one example of a conversion table of the parallax amount.

FIG. 16 is a graph illustrating one example of a conversion table for outputting an inputted parallax amount by converting the inputted parallax amount into a desired parallax amount.

The conversion table shown in graphs (1) and (2) of FIG. 16 is the conversion table for converting the parallax amount of each of the feature points of the input image into a proper parallax amount in correspondence with the value of the parallax amount. According to the conversion table shown in the graph (1), conversion for increasing the parallax amount (parallax amount tarp in the positive direction) of the feature point seeming to be near is performed, whereas conversion for decreasing the parallax amount (parallax amount which becomes larger in the negative direction) of the feature point seeming to be far is performed.

Meanwhile, according to the conversion table shown in the graph (2) of FIG. 16, conversion for decreasing the parallax amount (parallax amount large in the positive direction) of the feature point seeming to be near is performed, and conversion for increasing the parallax amount (parallax amount which becomes larger in the negative direction) of the feature point seeming to be far is performed.

<Fifth Example of Adjustment of Parallax Amount>

Figure 17:
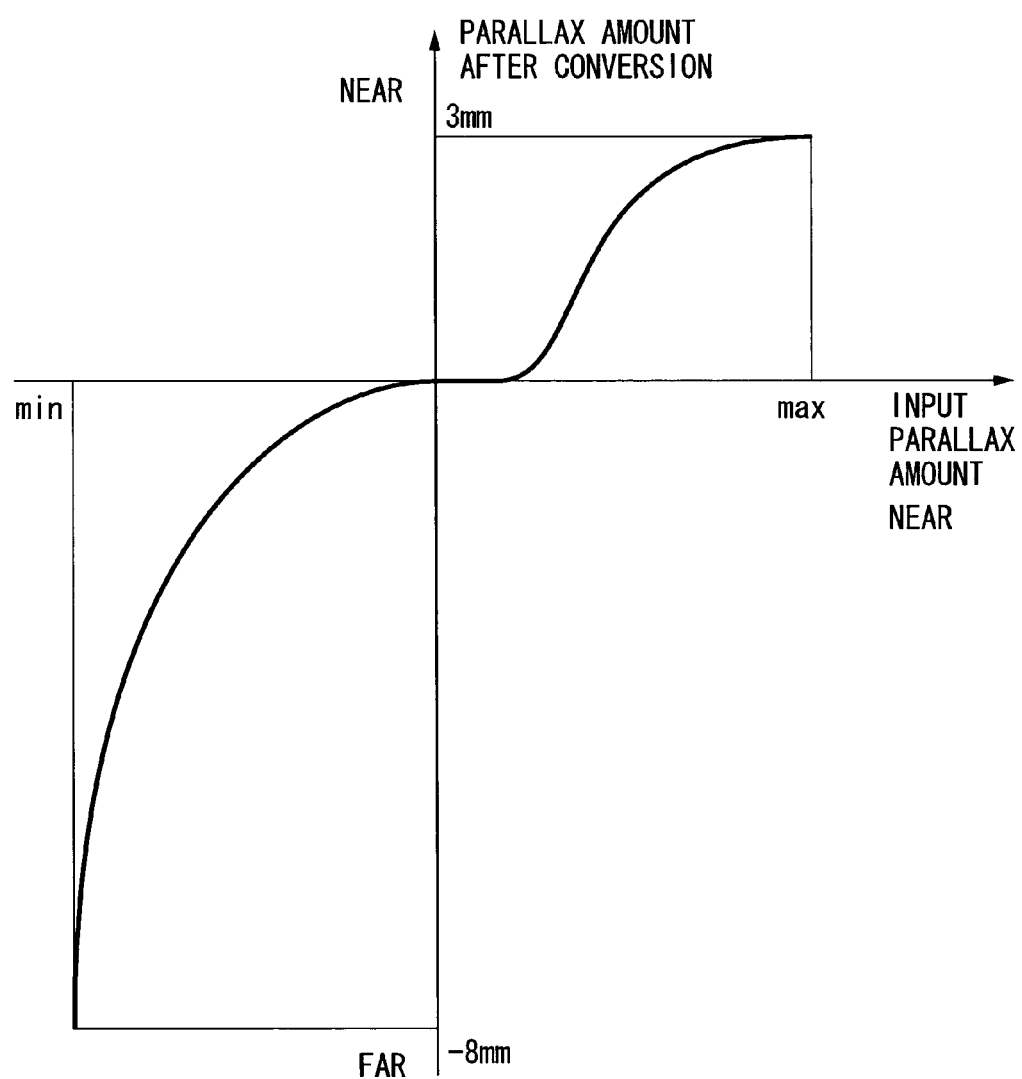
FIG. 17 is a graph illustrating another example of the conversion table of the parallax amount.

FIG. 17 is a graph illustrating another example of the conversion table for converting an inputted parallax amount into a desired parallax amount and outputting the parallax amount.

The conversion table shown in FIG. 17 is a conversion table which is used when a parallax image is printed on print paper (display section), and conversion is performed so that the maximum parallax amount (max) on the input image becomes the parallax amount of 3 mm on the print paper, and the maximum parallax amount (min) in the negative direction on the input image becomes the parallax amount of −8 mm on the print paper.

For example, the maximum value (foreground representative value) and the maximum value (background representative value) in the negative direction among the parallax amount of each of the feature points of the inputted parallax image are obtained, the parallax amount of each of the feature points is normalized by these foreground representative value and background representative value (normalized so that, for example, the foreground representative value becomes 1, and the background representative value becomes −1), and the normalized parallax amount is converted into the parallax amount on the print paper based on the conversion table shown in FIG. 17.

A lenticular sheet is attached onto the surface of the print paper on which the parallax image with the parallax amount adjusted as described above is printed, and thereby, photographic print capable of being stereoscopically viewed is provided.

It is confirmed by experiment that in the photographic print capable of being stereoscopically viewed, a more preferable stereoscopic image can be visually recognized when the maximum parallax amount (max) of each of the parallax images on the print is 3 mm, and the maximum parallax amount (min) in the negative direction is −8

[Example of Adjusting Parallax Amount by Display Device]

Figure 18:
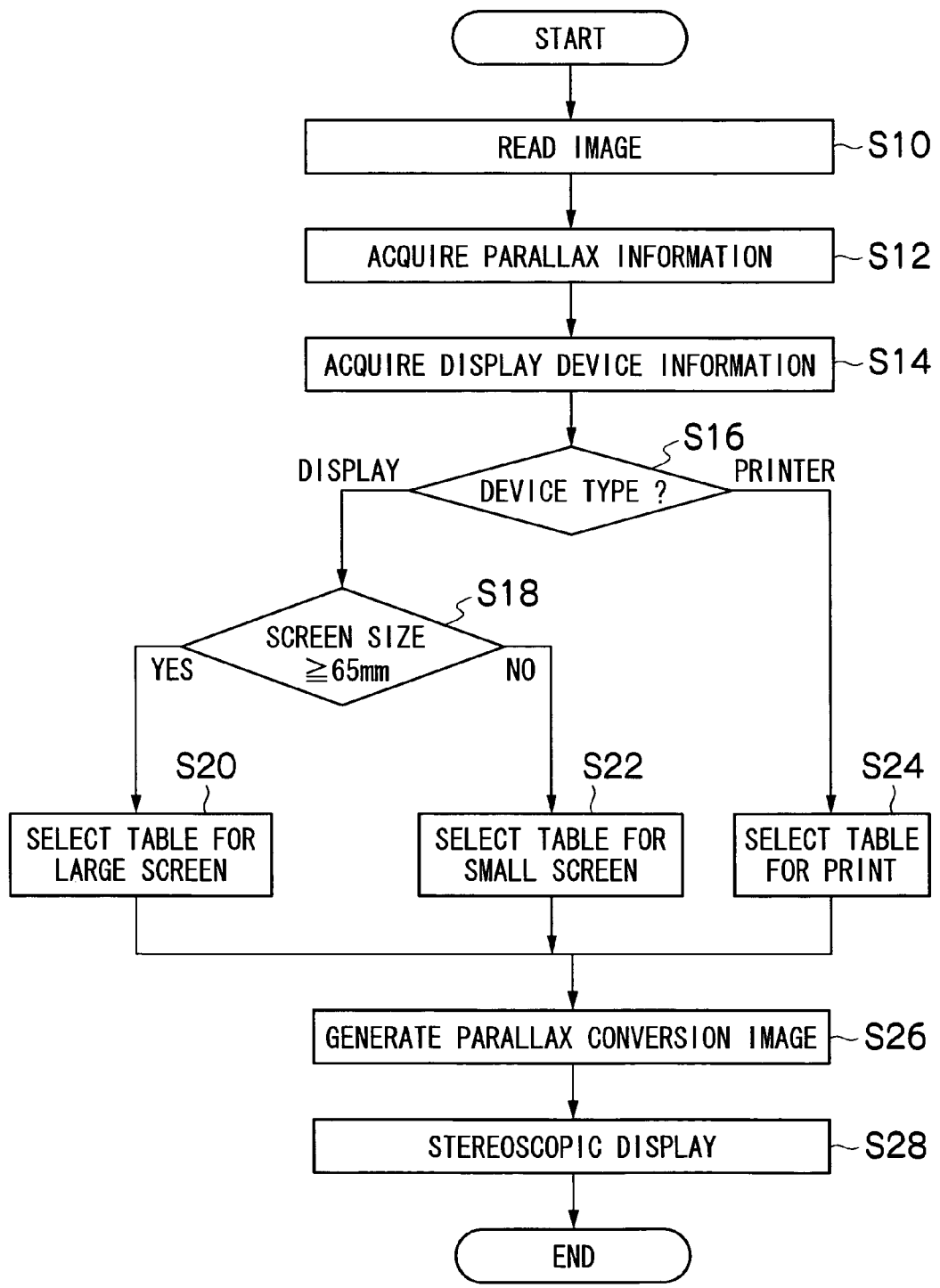
FIG. 18 is a flowchart illustrating an example of adjusting a parallax amount by a display device.

FIG. 18 is a flowchart illustrating an example of adjusting a parallax amount by a display device.

First, a plurality of parallax images are read (step S10), and the parallax amount of the feature point (corresponding point) in each of the parallax images is acquired (step S12). When the individual information of the 3D image file includes the coordinate value of each of the feature points as shown in FIG. 12, the parallax amount can be calculated from the coordinate value, whereas when the individual information of the 3D image file does not include the coordinate value of each of the feature points, the feature point is extracted from each of the parallax images, and the coordinate value of the viewpoint is acquired, whereby the parallax amount is calculated.

Next, the information of the display device is acquired (step S14). For acquisition of the information of the display device, the information of the display device can be automatically acquired from the display device side by connecting the 3D image output device according to the presently disclosed subject matter to the display device, or the information of the display device can be manually inputted.

Subsequently, the type (a display, a printer) of the device is discriminated from the acquired information of the display device (step S16), and when the type of the device is discriminated as a display, it is determined whether or not the screen size of the display is a predetermined size (the length in the horizontal direction is 65 mm) or more (step S18). 65 mm is a space between the left and right eyes of a human being.

When the device type is determined as a display, and the screen size is determined as 65 mm or more here, a large screen table is selected as the conversion table for converting the parallax amount (step S20). When the screen size is determined as less than 65 mm, the table for a small screen is selected as the conversion table (step S22).

Meanwhile, when the device type is determined as a printer, a printing table is selected as the conversion table (step S24).

For example, it is conceivable that as the above described table for a large screen, the conversion table shown in the graph (2) of FIG. 16 is applied and as the table for a small screen, the conversion table shown in the graph (1) of FIG. 16 is applied.

According to the above, in the case of the display with a large screen, the parallax image with the popping-up amount of the foreground being suppressed and the sense of depth of the background being emphasized can be generated, a stereoscopic image with soft stereoscopic vision can be displayed, and the sense of fatigue of a viewer can be reduced. Further, in the case of the display with a small screen, the viewpoint image with the foreground seeming to pop up more forward while the sense of depth of the background is suppressed can be generated, and a stereoscopic image with more impactful stereoscopic vision can be displayed.

Meanwhile, as the table for printing, the conversion table shown in FIG. 17 is used. According to this, more preferable photographic print capable of being stereoscopically viewed can be printed. In this embodiment, when the device type is a printer, the conversion table is not switched in accordance with the print size. This is because it is confirmed that preferable photographic print capable of being stereoscopically viewed is obtained irrespective of the print size of photographic print according to the conversion table shown in FIG. 17.

When the conversion table is selected as described above, each of the parallax amounts to be inputted is converted based on the selected conversion table, and the parallax image corresponding to the parallax amount of each of the feature points after conversion (after parallax adjustment) is generated (step S26). Each of the parallax images thus generated is outputted to the 3D display device, and stereoscopic vision of the 3D image is enabled (step S28).

<Sixth Example of Adjustment of Parallax Amount>

Figure 19:
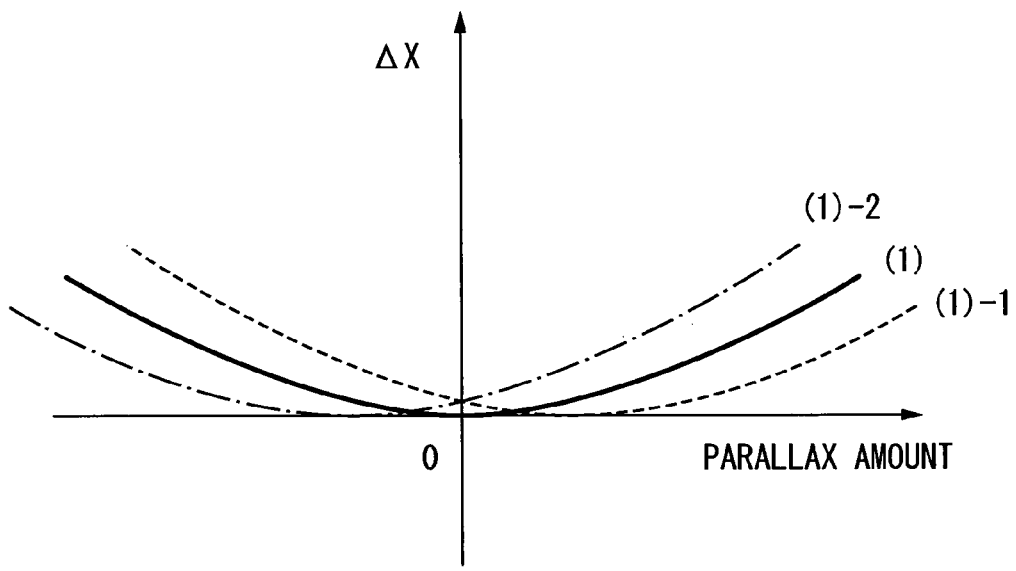
FIG. 19 is a graph illustrating another example of the parallax adjustment parameter $\Delta x$.

FIG. 19 is a graph illustrating another example of the parallax adjustment parameter $\Delta x$ for adjusting a parallax amount.

A graph (1)-1 of FIG. 19 is a graph obtained by shifting a graph (1) (corresponding to the graph (1) of FIG. 13) in the positive direction of the parallax amount. A graph (1)-2 of FIG. 19 is a graph obtained by shifting the graph (1) in the negative direction of the parallax amount.

Accordingly, when the parallax amount of the parallax image is adjusted by the parallax adjustment parameter $\Delta x$ shown in the graph (1)-1, the parallax image with the popping-up amount of the foreground being reduced and the sense of depth of the background being also reduced as compared with the parallax image with the parallax amount being adjusted by the parallax adjustment parameter $\Delta x$ shown in the graph (1), is generated.

Meanwhile, when the parallax amount of the parallax image is adjusted by the parallax adjustment parameter $\Delta x$ shown in the graph (1)-2, the parallax image with the popping-up amount of the foreground being emphasized and the sense of the depth of the background being also emphasized as compared with the parallax image with the parallax amount being adjusted by the parallax adjustment parameter $\Delta x$ shown in the graph (1) is generated.

Further, the parallax adjustment parameters $\Delta x$ shown in the above described graphs (1)-1, (1) and (1)-2 can be selected in accordance with the screen size of the 3D display. In this case, it is conceivable to apply the parallax adjustment parameters $\Delta x$ shown in the graphs (1)-1, (1) and (1)-2 in accordance with the large screen, middle screen and small screen.

Further, the above described graphs (1)-1, (1) and (1)-2 can be selected in accordance with the visual distance without being limited to the screen size of the 3D display, and selection of the graph (1)-1 is conceivable when the visual distance is short, and selection of the graph (1)-2 is conceivable when the visual distance is long. The visual distance can be automatically acquired by the distance measuring device which is placed at the 3D display or in the vicinity of the 3D display, or the visual distance can be manually inputted.

<Seventh Example of Adjustment of Parallax Amount>

Figure 20:
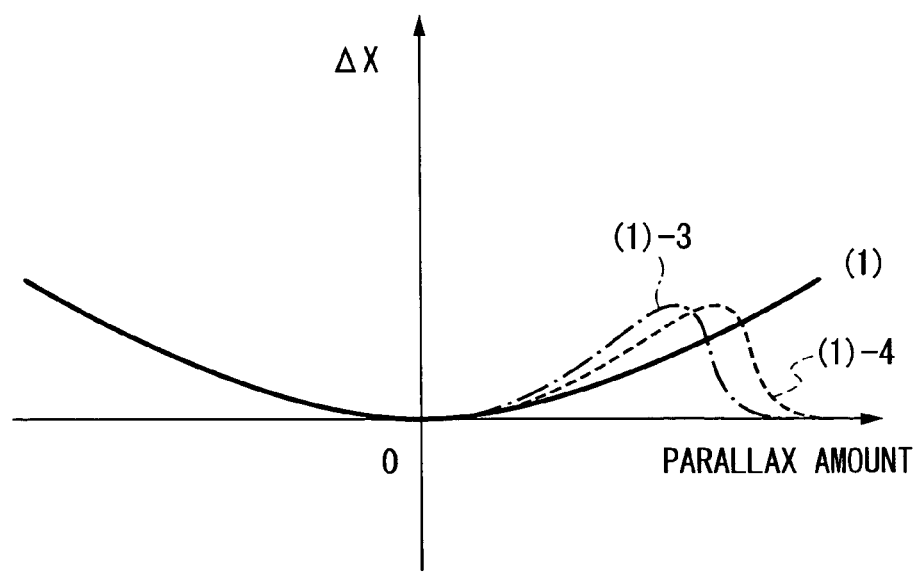
FIG. 20 is a graph illustrating still another example of the parallax adjustment parameter Δx.

FIG. 20 is a graph illustrating still another example of the parallax adjustment parameter $\Delta x$ for adjusting the parallax amount.

The parallax adjustment parameters $\Delta x$ shown in graphs (1)-3 and (1)-4 of FIG. 20 are suppressed not to emphasize a parallax when the parallax becomes larger in the positive direction by a fixed value or more. This is because if the parallax is given excessively, the image cannot be visually recognized as 3D.

Further, the parallax adjustment parameters $\Delta x$ shown in the graphs (1)-3 and (1)-4 of FIG. 20 can be selected in accordance with the screen size of the 3D display. In this case, it is conceivable to apply the parallax adjustment parameters $\Delta x$ shown in the graphs (1)-3 and (1)-4 in correspondence with a small screen and a large screen.

The sixth example and the seventh example shown in FIGS. 19 and 20 are modified examples of the parallax adjustment parameter shown in the graph (1) of FIG. 13, and also can be applied when the parallax adjustment parameter shown in the graph (2) of FIG. 13, the parallax adjustment parameter $\Delta p$ shown in FIG. 15 and the conversion table of the parallax amount shown in FIG. 16 are modified.

[Others]

The 3D image output device (a digital photo frame, a digital camera) of this embodiment is the one to which the 3D display is integrated, but the presently disclosed subject matter also can be applied to a device which does not include a display device (for example, a personal computer main body) without being limited to this. Further, the 3D image output device according to the presently disclosed subject matter can be realized by hardware, or can be realized by the software which is installed in a personal computer main body.

The 3D display is not limited to the 3D LCD of the embodiment, but can be other 3D displays such as a 3D plasma display, and a 3D organic EL display.

Further, the presently disclosed subject matter is not limited to the aforementioned embodiments, and can be the one that can freely perform adjustment of the parallax amount irrespective of the perspective of a subject, and it goes without saying that various modifications can be made within the range without departing from the spirit of the presently disclosed subject matter.

REFERENCE SIGNS LIST

10 . . . three-dimensional image output device (3D image output device), 12, 150 . . . three-dimensional liquid crystal display (3D LCD), 20, 114 . . . central processing unit (CPU), 22, 128 . . . work memory, 26, 142 . . . display controller, 28, 136 . . . buffer memory, 30, 126 . . . EEPROM

The invention claimed is:

1. A three-dimensional image output device characterized by comprising:
    a viewpoint image acquiring device for acquiring a plurality of viewpoint images obtained by photographing a same subject from a plurality of viewpoints;
    a parallax information acquiring device for acquiring parallax amounts in a plurality of sets of feature points at which features correspond to one another from the acquired plurality of viewpoint images;
    a parallax amount adjusting device for adjusting the acquired parallax amount in each of the feature points, and performing adjustment of assigning different weights to the parallax amounts in accordance with values of the parallax amounts;
    a parallax image generating device for generating a parallax image corresponding to the parallax amount of each of the feature points after the adjustment; and
    a parallax image output device for outputting a plurality of parallax images including the generated parallax image, wherein
    the parallax amount adjusting device includes a plurality of conversion tables, each of which represents an input-output relationship of a parallax amount and a parallax adjustment parameter for adjusting the parallax amount, the input-output relationships of the plurality of conversion tables being different from each other, and the parallax amount adjusting device selects one of the conversion tables depending on a size of a display device used for stereoscopic display or a visual distance from among the plurality of conversion tables, reads out a parallax adjustment parameter corresponding to the acquired parallax amount of each of the feature points from the selected conversion table and performs adjustment of assigning different weights to the parallax amounts in accordance with the read parallax adjustment parameters.

2. The three-dimensional image output device according to claim 1,
    wherein the parallax information acquiring device acquires coordinate values of a plurality of sets of feature points at which features correspond to one another from the plurality of acquired viewpoint images, and acquires a difference of the coordinate values as the parallax amount in each of the feature points.

3. The three-dimensional image output device according to claim 1,
    wherein the parallax information acquiring device acquires a plurality of parallax amounts including a foreground representative parallax amount representing a parallax amount of a feature point which is nearest to a prescribed viewpoint at which one of the viewpoint images are taken, and a background representative parallax amount representing a parallax amount of a feature point which is farthest from the prescribed viewpoint.

4. The three-dimensional image output device according to claim 3,
    wherein the parallax amount adjusting device adjusts the foreground representative parallax amount and the background representative parallax amount after adjustment to be predetermined parallax amounts respectively.

5. The three-dimensional image output device according to claim 1, characterized in that
    the parallax amount adjusting device classifies a plurality of parallax amounts acquired by the parallax information acquiring device into at least three kinds of parallax amounts, the parallax amounts including a parallax amount of a near feature point, a parallax amount of a far feature point, and a parallax amount of a feature point other than the near feature point and the far feature point, and performs adjustment of a parallax amount of assigning a different weight to each of the classified parallax amounts.

6. The three-dimensional image output device according to claim 1, wherein the parallax amount adjusting device performs weighting adjustment for a parallax amount of the near feature point to make the parallax amount larger, and performs weighting adjustment for a parallax amount of the far feature point to make the parallax amount smaller.

7. The three-dimensional image output device according to claim 1,
wherein the parallax amount adjusting device performs weighting adjustment for the parallax amount of the near feature point to make the parallax amount smaller, and performs weighting adjustment for the parallax amount of the far feature point to make the parallax amount larger.

8. The three-dimensional image output device according to claim 1, characterized in that
the input-output relationships in the plurality of the conversion tables are adjusted so that the adjusted parallax amount cannot be greater than a prescribed maximum parallax amount.

9. The three-dimensional image output device according to claim 1, characterized by further comprising:
a display device information acquiring device for acquiring display device information of a display device used for stereoscopic display, the information including at least size information of the display device, and
wherein the parallax amount adjusting device performs adjustment of a parallax amount corresponding to the display information, based on the display device information acquired by the display device information acquiring device.

10. The three-dimensional image output device according to claim 9, characterized in that
the display device information acquiring device acquires display device information corresponding to a type of the display device and representing that the display device is a stereoscopic display device or a stereoscopic display print.

11. A three-dimensional image output method, characterized by comprising:
a viewpoint image acquiring step of acquiring a plurality of viewpoint images obtained by photographing a same subject from a plurality of viewpoints;
a parallax information acquiring step of acquiring parallax amounts in a plurality of sets of feature points at which features correspond to one another from the acquired plurality of viewpoint images;
a parallax amount adjusting step of adjusting the acquired parallax amount of each of the feature points, and performing adjustment of assigning different weights to the parallax amounts in accordance with values of the parallax amounts;
a parallax image generating step of generating a parallax image corresponding to the parallax amount of each of the feature points after the adjustment; and
a parallax image output step of outputting a plurality of parallax images including the generated parallax image, wherein
the parallax amount adjusting step selects, from among a plurality of conversion tables, each of which represents an input-output relationship of a parallax amount and a parallax adjustment parameter for adjusting the parallax amount, the input-output relationships of the plurality of conversion tables being different from each other, one of the conversion tables depending on a size of a display device used for stereoscopic display or a visual distance, reads out a parallax adjustment parameter corresponding to the acquired parallax amount of each of the feature points from the selected conversion table and performs adjustment of assigning different weights to the parallax amounts in accordance with the read parallax adjustment parameters.

12. The three-dimensional image output method according to claim 11,
wherein, in the parallax information acquiring step, a plurality of parallax amounts including a foreground representative parallax amount representing a parallax amount of a feature point which is nearest to a prescribed viewpoint at which one of the viewpoint images are taken, and a background representative parallax amount representing a parallax amount of a feature point which is farthest from the prescribed viewpoint, are acquired.

13. The three-dimensional image output method according to claim 11, characterized in that
in the parallax amount adjusting step, a plurality of parallax amounts acquired in the parallax information acquiring step are classified into at least three kinds of parallax amounts, the parallax amounts including a parallax amount of a near feature point, a parallax amount of a far feature point, and a parallax amount in a feature point other than the near feature point and the far feature point, and adjustment of a parallax amount of assigning a different weight to each of the classified parallax amounts is performed.

14. The three-dimensional image output method according to claim 13, characterized by further comprising a display device information acquiring step of acquiring display device information of a display device used for stereoscopic display, the information including at least size information of the display device, and
wherein the parallax amount adjusting step includes steps of:
selecting any one of a first parallax amount adjustment step and a second parallax amount adjustment step based on the acquired display device information, the first parallax amount adjustment step performing weighting adjustment for a parallax amount of a near feature point to make the parallax amount larger, and performing weighting adjustment for a parallax amount of a far feature point to make the parallax amount smaller, and the second parallax amount adjustment step performing weighting adjustment for the parallax amount of a near feature point to make the parallax amount smaller, and performing weighting adjustment for the parallax amount of a far feature point to make the parallax amount larger; and
adjusting a parallax amount by the selected parallax amount adjustment step.

15. A three-dimensional image output device characterized in comprising:
a viewpoint image acquiring device for acquiring a plurality of viewpoint images obtained by photographing a same subject from a plurality of viewpoints;
a parallax information acquiring device for acquiring parallax amounts in a plurality of sets of feature points at which features correspond to one another from the acquired plurality of viewpoint images;
a parallax amount adjusting device for adjusting the acquired parallax amount in each of the feature points, and performing adjustment of assigning different weights to the parallax amounts in accordance with values of the parallax amounts;

a parallax image generating device for generating a parallax image corresponding to the parallax amount of each of the feature points after the adjustment; and a parallax image output device for outputting a plurality of parallax images including the generated parallax image, wherein the parallax amount adjusting device includes a plurality of conversion tables, each of which represents an input-output relationship of a parallax amount and an adjusted parallax amount, the input-output relationships of the plurality of conversion tables being different from each other, and the parallax amount adjusting device reads out an adjusted parallax amount corresponding to the acquired parallax amount of each of the feature points from the selected conversion table.

16. The three-dimensional image output device according to claim 15, characterized in that the parallax amount adjusting device classifies a plurality of parallax amounts acquired by the parallax information acquiring device into at least three kinds of parallax amounts, the parallax amounts including a parallax amount of a near feature point, a parallax amount of a far feature point, and a parallax amount of a feature point other than the near feature point and the far feature point, and performs adjustment of a parallax amount of assigning a different weight to each of the classified parallax amounts.

17. The three-dimensional image output device according to claim 15, characterized by further comprising:

a display device information acquiring device for acquiring display device information of a display device used for stereoscopic display, the information including at least size information of the display device, and wherein the parallax amount adjusting device performs adjustment of a parallax amount corresponding to the display information, based on the display device information acquired by the display device information acquiring device.

18. The three-dimensional image output device according to claim 17, characterized in that the display device information acquiring device acquires display device information corresponding to a type of the display device and representing that the display device is a stereoscopic display device or a stereoscopic display print.

19. The three-dimensional image output device according to claim 15, characterized in that the input-output relationships in the plurality of conversion tables are adjusted so that the adjusted parallax amount cannot be greater than a prescribed maximum parallax amount.

20. A three-dimensional image output method, characterized by comprising:

a viewpoint image acquiring step of acquiring a plurality of viewpoint images obtained by photographing a same subject from a plurality of viewpoints;

a parallax information acquiring step of acquiring parallax amounts in a plurality of sets of feature points at which features correspond to one another from the acquired plurality of viewpoint images;

a parallax amount adjusting step of adjusting the acquired parallax amount of each of the feature points, and performing adjustment of assigning different weights to the parallax amounts in accordance with values of the parallax amounts;

a parallax image generating step of generating a parallax image corresponding to the parallax amount of each of the feature points after the adjustment; and a parallax image output step of outputting a plurality of parallax images including the generated parallax image, wherein the parallax amount adjusting step selects, from among a plurality of conversion tables, each of which represents an input-output relationship of a parallax amount and an adjusted parallax amount, the input-output relationships of the plurality of conversion tables being different from each other, one of the conversion tables depending on a size of a display device used for stereoscopic display or a visual distance, and reads out an adjusted parallax amount corresponding to the acquired parallax amount of each of the feature points from the selected conversion table.

21. The three-dimensional image output method according to claim 20, characterized in that, in the parallax amount adjusting step, a plurality of parallax amounts acquired in the parallax information acquiring step are classified into at least three kinds of parallax amounts, the parallax amounts including a parallax amount of a near feature point, a parallax amount of a far feature point, and a parallax amount in a feature point other than the near feature point and the far feature point, and adjustment of a parallax amount of assigning a different weight to each of the classified parallax amounts is performed.

22. The three-dimensional image output method according to claim 21, characterized by further comprising a display device information acquiring step of acquiring display device information of a display device used for stereoscopic display, the information including at least size information of the display device, and wherein the parallax amount adjusting step includes steps of:

selecting any one of a first parallax amount adjustment step and a second parallax amount adjustment step based on the acquired display device information, the first parallax amount adjustment step performing weighting adjustment for a parallax amount of a near feature point to make the parallax amount larger, and performing weighting adjustment for a parallax amount of a far feature point to make the parallax amount smaller, and the second parallax amount adjustment step performing weighting adjustment for the parallax amount of a near feature point to make the parallax amount smaller, and performing weighting adjustment for the parallax amount of a far feature point to make the parallax amount larger; and adjusting a parallax amount by the selected parallax amount adjustment step.

* * * * *